(12) United States Patent
Miyadera et al.

(10) Patent No.: US 7,574,081 B2
(45) Date of Patent: Aug. 11, 2009

(54) OPTICAL SYSTEM WITH OPTICAL WAVEGUIDES

(75) Inventors: Nobuo Miyadera, Tsukuba (JP); Rei Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/604,766

(22) Filed: Nov. 28, 2006

(65) Prior Publication Data
US 2007/0110363 A1 May 17, 2007

(51) Int. Cl.
G02B 6/42 (2006.01)
G02B 6/12 (2006.01)
G02B 6/26 (2006.01)
G02B 6/30 (2006.01)
G02F 1/01 (2006.01)

(52) U.S. Cl. .................. 385/28; 385/1; 385/14; 385/15; 385/16; 385/19; 385/24; 385/27; 385/41; 385/45; 385/46; 385/47; 385/49; 385/52

(58) Field of Classification Search .......... 385/1, 385/14–16, 19, 24, 27, 41, 45–47, 49, 52
See application file for complete search history.

(56) References Cited

U.S. PATENT DOCUMENTS

| 5,757,995 A * | 5/1998 | Chen et al. ............... 385/45 |
| 7,065,269 B2 * | 6/2006 | Higuchi et al. ........... 385/24 |
| 7,130,503 B2 * | 10/2006 | Terakawa et al. ......... 385/24 |
| 2002/0191907 A1 * | 12/2002 | Kinoshita et al. ......... 385/24 |

FOREIGN PATENT DOCUMENTS

| JP | 08-190026 | 7/1996 |
| JP | 2000-221345 | 8/2000 |
| JP | 2002-006155 | 1/2002 |
| WO | WO 98/39679 | 9/1998 |

OTHER PUBLICATIONS

The Institute of Electronics, Information and Communication Engineers, 2005 Collected Papers from General Conference. "Electronics", Mar. 21-24, 2005 Osaka University, Toyonaka Campus, Toyonaka-city.

* cited by examiner

*Primary Examiner*—Charlie Peng
*Assistant Examiner*—Hung Lam
(74) *Attorney, Agent, or Firm*—Antonelli, Terry, Stout & Kraus, LLP.

(57) ABSTRACT

The present invention provides an optical system with waveguides, which comprises first, second and third optical input/output means (12, 14, 16), fourth and fifth multi-mode optical waveguides (20, 22) each capable of propagating light with plural propagation modes, and optical-filter mounting means (26) for mounting an optical filter (24) between the fourth and fifth multi-mode optical waveguides (20, 22) across a traveling direction of light in the fourth and fifth multi-mode optical waveguides (20, 22). The first optical input/output means (12) is connected to an end face of the fourth multi-mode optical waveguide (20) on a side thereof opposite to the optical-filter mounting means (26). Each of the second and third optical input/output means (14, 16) is connected to an end face of the fifth multi-mode optical waveguide (22) on a side opposite to the optical-filter mounting means (26). Respective widths in a direction orthogonal to the light-traveling direction of the fourth and fifth multi-mode optical waveguides (20, 22) are different from each other.

66 Claims, 11 Drawing Sheets

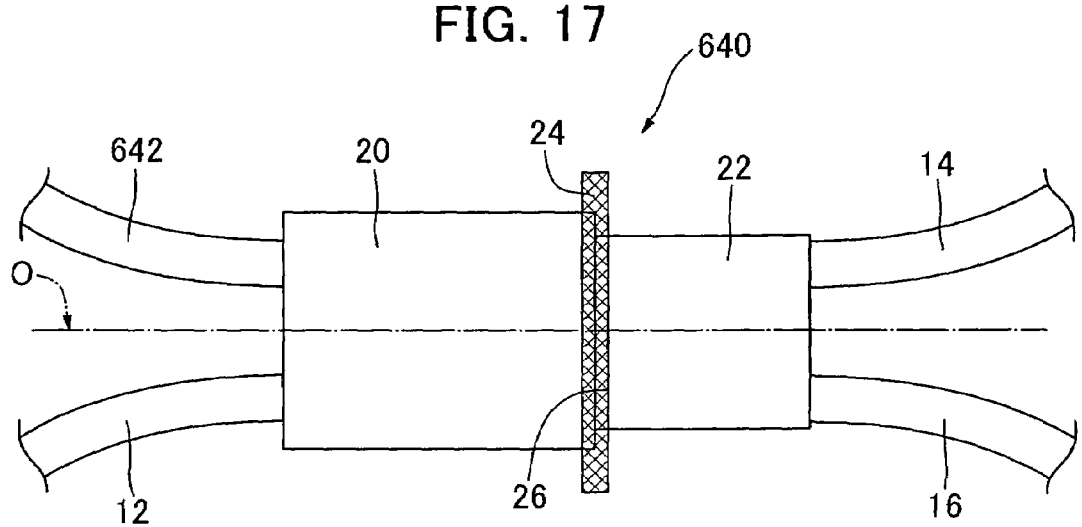
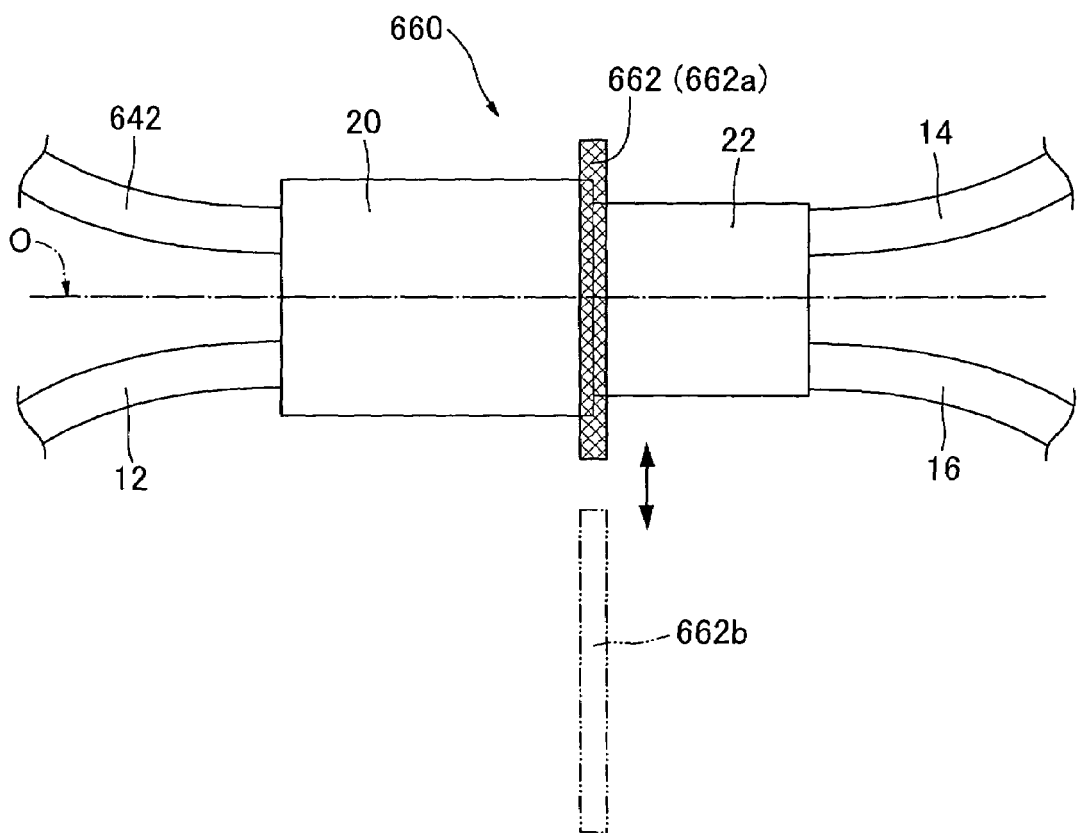

OPTICAL SYSTEM WITH OPTICAL WAVEGUIDES

FIELD OF THE INVENTION

The present invention relates to an optical system with optical waveguides, and more specifically, to an optical system with a so-called multi-mode interference (MMI) optical waveguide.

BACKGROUND OF THE INVENTION

In connection with recent progress of multimedia communications including Internet communications, researches on wavelength division multiplexing (WDM) technologies for higher-speed and larger-capacity communications are actively promoted. One of the key optical components in establishing future WDM communication systems is an optical coupling/splitting device for coupling or splitting a plurality of lights having respective wavelengths. In view of reduction of a cost and a size of the optical coupling/splitting device and enhancement in functionality thereof, it is integrated so that the device is made of silica (glass) or polymer on a substrate, and an optical transmitter and/or receiver are/is mounted on the substrate.

Several types of optical coupling/splitting devices are known, for example, a filter-type device, a directional-coupler-type device and a Mach-Zehnder-interferometer-type device.

Regarding a type of an optical coupling/splitting device which is advantageous to reducing a size of a module thereof, a filter-type optical coupling/splitting device disclosed in the Japanese Patent Laid-open Publication No. 8-190026 (Patent Publication 1) is known. In this filter-type optical coupling/splitting device, as shown in FIG. 19, two straight optical waveguides 401, 402 are intersected with each other at a junction and an optical filter 404 is embedded at the junction. This filter-type optical coupling/splitting device utilizes a property of the optical filter 404 which property allows light to be transmitted therethrough or reflected thereat depending on a wavelength of light so that a WDM light or signal can be split into a reflected light and a transmitted light. In this filter-type optical coupling/splitting device, it is necessary to design such that an intersecting point 403 between respective optical axes of the two optical waveguides 401, 402 joining together at an angle 2θ is located on an equivalent reflection center plane 405 of the optical filter 404. In FIG. 19, axes of the optical waveguides 401, 402 and 430 are respectively indicated by reference numerals 406, 407 and 408.

In an above filter-type optical coupling/splitting device, reflection means such as an optical filter is mounted in a filter groove at the junction. In such optical systems or devices utilizing a reflected light produced by the reflection means, it is necessary to minimize tolerance relative to a positional deviation of the reflection means. Namely, when the reflection means is set with a positional deviation, a change in light propagating characteristics around the junction region must be as small as possible. When an input light is reflected at the reflection means, a positional deviation of the reflection means affects double an optical path length of the input light to the reflection means. Thus, in order to ensure adequate light propagating characteristics, the tolerance relative to the positional deviation of the reflection means must be as small as possible.

In order to solve a problem about the serious adverse effect on light transmitting efficiency due to such a positional deviation of the reflection means of the filter-type optical coupling/splitting device disclosed in the Patent Publication 1, the Japanese Patent Laid-open Publication No. 2002-6155 (Patent Publication 3) provides an optical coupling/splitting device which comprises first, second and third optical waveguides, a fourth optical waveguide capable of propagating light with plural propagation modes, and an optical filter disposed across a light-traveling direction in the fourth optical waveguide. The first optical waveguide is connected to a first end face of the fourth optical waveguide, and the second and third optical waveguides are connected to a second end face thereof on a side opposite to that of the first end face at respective locations. Each of the first and second end faces of the fourth optical waveguide is located across the light-traveling direction in the fourth optical waveguide. The fourth optical waveguide is operable to propagate light in a multi-mode in such a manner that light having a first wavelength input from one of the second and third optical waveguides is transmitted through the optical filter to the first optical waveguide as light corresponding to the input light having the first wavelength, and that light having a second wavelength input from one of the second and third optical waveguides is reflected at the optical filter to the other thereof as light corresponding to the input light having the second wavelength.

More specifically, as shown in FIGS. 20 and 21, in the optical coupling/splitting device disclosed in the Patent Publication 3, each of the optical waveguides is formed on a given substrate 520, such as a silicon (Si) substrate 520, using two types of fluorinated polyimide resins different in refractive index from each other. This optical waveguide comprises a first cladding layer 521, a core 522 and a second cladding layer 523. In FIGS. 20 and 21, the reference numeral 524 indicates a filter-insertion groove. Just as an example, thicknesses of the lower cladding layer 521, the core 522 and the upper cladding layer 523 are respectively 5 µm, 6.5 µm and 15 µm. A value of relative index difference between the core and the cladding layers is 0.3%.

As shown in FIG. 21, an optical coupling/splitting section includes a multi-mode interference-type optical waveguide 510, a first optical waveguide 511, a second optical waveguide 521 and a third optical waveguide 513. The multi-mode interference-type optical waveguide 510 has a width W of 25 µm and a length L of 1200 µm. A distance between the optical waveguides 512, 513 is 5 µm and each of the optical waveguides 511, 512, 513 has a width D of 6.5 µm.

The optical filter 515 of a dielectric multilayer-film type filter 515 adapted to reflect light having a wavelength of 1.31 µm and transmit light having a wavelength of 1.55 µm when the light is input into the filter 515 at an incident angle of zero degree. The dielectric multilayer-film filter 515 has a thickness of 15 µm and a conventional configuration. The dielectric multilayer-film filter 515 is inserted into a groove 524 which is formed to have a width of 15 µm and located in a central region of the multi-mode interference-type optical waveguide 510, and glued by using UV (Ultra-Violet) (not shown). The groove 524 is formed, for example, by using a dicing saw. The second and third optical waveguides 512, 513 are formed to extend parallel or approximately parallel to each other at respective connecting locations 532, 533 in which they are connected to the multi-mode interference-type optical waveguide 510.

An operational principle of the optical coupling/splitting device disclosed in the Patent publication 3 is as follows. As shown in FIGS. 21 and 22, the plurality of optical waveguides, i.e., the optical waveguides 512, 513, are connected to one of the opposite end faces of the multi-mode interference-type optical waveguide 510 at respective individual positions. In the multi-mode interference-type optical waveguide 510, an intensity peak portion of light is shifted in a direction perpendicular to the light-traveling direction according to the traveling of light.

The optical filter 515 is disposed to extend perpendicular or approximately perpendicular to the light-traveling direction in which multi-mode light is propagated through the multi-mode interference-type optical waveguide 510. This makes it possible to prevent undesirable light leakage causing noise, for example, when light input from the optical waveguide 513 is transmitted to the optical filter 515.

Further, in the optical device disclosed in Patent Publication 3 in which a thin-film optical device such as an optical filter and the multi-mode interference-type optical waveguide are disposed side-by-side, an incident angle of light into the thin-film device is close to zero degree. This makes it possible to effectively eliminate a polarization dependency of the reflected light or the transmitted light in the thin-film optical devices, and reduce polarization dependent loss (PDL).

In a usual optical system having a conventional multi-mode interference optical waveguide without employing any thin-film optical device (hereinafter, referred to "MMI"), a width of a MMI section is constant, a width of an input optical waveguide equals to that of an output optical waveguide, and a positional relationship between the input and output optical waveguides is symmetrical relative to an axis of the MMI section, as described in Japanese Patent Laid-open Publication No. 2000-221345 (Patent Publication 2). This optical system utilizes a self-imaging effect in the MMI section.

Patent Publication 1: Japanese Patent Laid-Open Publication No. 8-190026

Patent Publication 2: Japanese Patent Laid-Open Publication No. 2000-221345

Patent Publication 3: Japanese Patent Laid-Open Publication No. 2002-6155

The optical system including the optical coupling/splitting device and the waveguides disclosed in the Patent Publication 3 can solve the problem about the difficulty in production process, i.e., the requirement of minimizing tolerance relative to a positional deviation of the reflection means of the optical coupling/splitting device disclosed in the Patent Publication 1, and a problem about production cost associated with the difficulty in production process. However, a size of the optical coupling/splitting device is relatively large. If the size thereof is reduced to meet practical requirements, light transmitting efficiency thereof will be significantly deteriorated, and likely to cause light leakage between the optical waveguides.

Further, the present inventors found that, when a groove is formed in an MMI section in a direction perpendicular to an optical axis thereof and an a thin-film optical device is mounted into the groove, as disclosed in the Patent Publication 3, a light wave field caused by light input at an input end is not sufficiently converged in an output end. Thus, when an optical coupling/splitting device is configured as described in the Patent Publication 3, light to be output at an output end may cause radiation loss thereat so that insertion loss of the optical device becomes worse, and light not to be output at the output end leaks thereinto so that isolation of the optical device is deteriorated.

In view of the above problems in the conventional optical coupling/splitting device, it is an object of the present invention to provide an optical system with waveguides capable of reducing a size thereof without increasing a substantial production cost as compared with the conventional optical coupling/splitting device.

It is another object of the present invention to provide an optical system with waveguides capable of ensuring high light-transmitting efficiency while reducing light leakage between optical waveguides, to achieve highly-accuracy optical communications.

SUMMARY OF THE INVENTION

An optical system with waveguides of the present invention is concretely defined as follows. As used in the present invention, the term "a width of an optical waveguide" means a width of a core of an optical waveguide.

[Invention I]

An optical system with waveguides according to Invention I comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein respective widths in a direction orthogonal to the light-traveling direction of the fourth and fifth multi-mode optical waveguides are different from each other.

In the Invention I, since the respective widths of the fourth and fifth multi-mode optical waveguides in the direction orthogonal to the light-traveling direction are different from each other, a length $L_4$ and a width $W_4$ of the fourth multi-mode optical waveguide which are optimal to light having a certain wavelength and propagated through both the fourth and fifth multi-mode optical waveguides or propagated primarily through only the fourth multi-mode optical waveguide can be determined independently relative to a length $L_5$ and a width $W_5$ of the fifth multi-mode optical waveguide which are determined to be optimal to light having another wavelength and reflected at the optical filter to be transmitted between the second and third optical input/output means or propagated primarily through only the fifth multi-mode optical waveguide so that respective desirable characteristics of the optical system for the plurality of wavelengths of light can be compatible. In particular, when wavelengths of light to be used are largely different from each other, such as 1.31 μm and 1.55 μm, prominent advantage can be obtained. Specifically, regarding a wavelength of light transmitted through the optical filter, loss of signal light can be reduced while loss of crosstalk light can be increased.

Further, in the Invention I, the respective widths of the fourth and fifth multi-mode optical waveguides in a direction orthogonal to the light-traveling direction greatly affect a shift of a portion of light having a peak value of light intensity in a direction orthogonal to the light-traveling direction, as compared with the other parameters of the optical system. Thus, the optical system with waveguides according to the Invention I has an advantage of ensuring high light-propagating efficiency due to enhanced flexibility of design.

[Invention II]

In the Invention II, the width of the fourth multi-mode optical waveguide is greater than that of the fifth multi-mode optical waveguide.

According to the Invention II, since the width of the fourth multi-mode optical waveguide in the direction orthogonal to the light-traveling direction is greater than the width of the fifth multi-mode optical waveguide in the direction orthogonal to the light-traveling direction, the length $L_4$ and the width $W_4$ of the fourth multi-mode optical waveguide which are optimal to light having a certain wavelength and propagated through both the fourth and fifth multi-mode optical waveguides or propagated primarily through only the fourth multi-mode optical waveguide can be determined independently relative to the length $L_5$ and the width $W_5$ of the fifth multi-mode optical waveguide which are determined to be optimal to light having another wavelength and reflected at the optical filter to be transmitted between the second and third optical input/output means or propagated primarily through only the fifth multi-mode optical waveguide so that respective desirable characteristics of the optical system for the plurality of wavelengths of light can be compatible.

In particular, regarding light transmitted from the second optical input/output means to the first optical input/output means, excess loss caused by the optical filter mounting means can be appropriately reduced. For example, when light having a wavelength of 1.31 μm is transmitted from the first optical input/output means to the second optical input/output means, and light having a wavelength of 1.49 μm is transmitted from the second optical input/output means to the first optical input/output means, great advantage can be obtained particularly in insertion loss of the latter light, i.e., that having a wavelength of 1.49 μm. Specifically, regarding a wavelength of light transmitted through the optical filter, loss of signal light can be reduced while loss of crosstalk light can be increased.

[Invention III]

In the Invention III, a width in a direction orthogonal to the light-traveling direction of one of the fourth and fifth multi-mode optical waveguides is smaller than a width in a direction orthogonal to the light-traveling direction of the other thereof, and one of the first, second and third optical input/output means through which light is transmitted most efficiently is connected to the former multi-mode optical waveguide.

In the Invention III having the above-stated configuration, when a plurality of lights having respective wavelengths different from each other are used, the multi-mode optical waveguides can be defined so that the light which is intended to be propagated most efficiently among the plurality of lights is selected to be transmitted with low loss.

By the way, light traveling in the optical waveguides is not largely spread in a direction orthogonal to the light-traveling direction, but light traveling through the optical filter mounting means, i.e., through a space without confinement effect of optical waveguide tends to be largely spread in the same direction. In the Invention III, light input into one of the optical input/output means is efficiently transmitted from one of the multi-mode optical waveguide having a relatively small width in the direction orthogonal to the light-traveling direction to the other multi-mode optical waveguide having a relatively large width in the same direction so that light propagation efficiency can be maintained at a high level.

[Invention IV]

In the Invention IV, each of widths in a direction orthogonal to the light-traveling direction of the fourth and fifth multi-mode optical waveguides is in the range of 5-20 μm.

When each of the widths of the fourth and fifth multi-mode optical waveguides in the direction orthogonal to the light-traveling direction is greater than 20 μm, a length of the optical system with waveguides in the light-traveling detection may increase. When each of the widths of the fourth and fifth multi-mode optical waveguides in the direction orthogonal to the light-traveling direction is smaller than 5 μm, a value of relative refractive index difference between a cladding and a core of the multi-mode optical waveguide is required to be large to define the multi-mode optical waveguide so that a normal single-mode optical fiber is not used as the optical input/output means. If such a normal single-mode optical fiber is used as the optical input/output means, an amount of coupling loss between the optical fiber and the multi-mode optical waveguide may greatly increase, namely, light may not be efficiently propagated.

Moreover, in the Invention IV, when each of the widths of the fourth and fifth multi-mode optical waveguides is smaller than 5 μm, an amount of coupling loss between the multi-mode optical waveguide and the optical input/output means connected thereto may increase resulting in an insertion loss increase of the whole optical system. When each of the widths of the fourth and fifth multi-mode optical waveguides is greater than 20 μm, a length of the multi-mode optical waveguides may increase resulting in a longer optical waveguide element including the multi-mode optical waveguides may increase. The longer the length of the optical waveguide element is, the greater an amount of transmitting-loss thereof is, namely the greater an amount of insertion loss of the optical system is.

[Invention V]

In Invention V, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide.

In the Invention V, since half of the distance between respective centers of input/output ends of the second and third optical input/output means connected to the fifth multi-mode optical waveguide is different from the distance between the center line between the respective centers of the input/output ends of the second and third optical input/output means, and the center of the input/output end of the first optical input/output means connected to the fourth multi-mode optical waveguide, the latter distance which is optimal to light having a certain wavelength and propagated through both the fourth and fifth multi-mode optical waveguides or propagated primarily through only the fourth multi-mode optical waveguide can be determined independently relative to the former distance which is determined to be optimal to light having another wavelength and reflected at the optical filter to be transmitted between the second and third optical input/output means or propagated primarily through only the fifth multi-mode optical waveguide so that respective desirable characteristics of the optical system for the plurality of wavelengths of light can be compatible. In particular, when wavelengths of light to be used are largely different from each other, such as 1.31 µm and 1.55 µm, prominent advantage can be obtained. Specifically, regarding a wavelength of light transmitted through the optical filter, loss of signal light can be reduced while loss of crosstalk light can be increased.

In the Invention V, when each of the second and third optical input/output means is a curved optical waveguide, a distance between the second and third optical input/output means is increased, and the first optical input/output means is an optical fiber or a straight optical waveguide, an optimal coupling loss can be obtained so that a length of the optical system in the light-traveling direction can be reduced in comparison with an optical system in which all of the first to third optical input/output means are curved optical waveguides. This reduction allows propagation loss of the optical system to be reduced resulting in a lower insertion loss.

Further, in the invention V, when the first optical input/output means is a straight optical waveguide or an optical fiber, optical system with waveguides has an advantage of ensuring high light-propagating efficiency due to enhanced flexibility of design. Still further, in the Invention V, the respective optical input/output means are not aligned in line relative with each other so that possibility of causing a harmful signal, namely, possibility that light is leaked from one of the optical input/output means and enters into the other optical input/output means can be reduced.

[Invention VI]

In Invention VI, an optical system with waveguides comprises a first optical input/output means, a second optical input/output means, a third optical input/output means, fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein a width in a direction orthogonal to the light-traveling direction of the first optical input/output means is different from another/other width(s) in a direction orthogonal to the light-traveling direction of at least one of the second and third optical input/output means.

In the Invention VI, the width of the first optical input/output means in the direction orthogonal to the light-traveling direction which are optimal to light having a certain wavelength and propagated through both the fourth and fifth multi-mode optical waveguides or propagated primarily through only the fourth multi-mode optical waveguide can be determined independently relative to respective widths of the second and third optical input/output means in the direction orthogonal to the light-traveling direction which are determined to be optimal to light having another wavelength and reflected at the optical filter to be transmitted between the second and third optical input/output means or propagated primarily through only the fifth multi-mode optical waveguide so that respective desirable characteristics of the optical system for the plurality of wavelengths of light can be compatible. In particular, when wavelengths of light to be used are largely different from each other, such as 1.31 µm and 1.55 µm, prominent advantage can be obtained. Specifically, regarding a wavelength of light transmitted through the optical filter, loss of signal light can be reduced while loss of crosstalk light can be increased.

In the Invention VI, when each of the second and third optical input/output means is a curved optical waveguide, a distance between the second and third optical input/output means is increased, and the first optical input/output means is an optical fiber or a straight optical waveguide, an optimal coupling loss can be obtained so that a length of the optical system in the light-traveling direction can be reduced in comparison with that of an optical system in which all of the first to third optical input/output means are curved optical waveguides. This reduction allows propagation loss of the optical system to be reduced resulting in a lower insertion loss thereof.

Further, in the invention VI, when the first optical input/output means is a straight optical waveguide or an optical fiber, the optical system with waveguides has an advantage of ensuring high light-propagating efficiency due to enhanced flexibility of design.

[Invention VII]

In the Invention VII, the width in the direction orthogonal to the light-traveling direction of the first optical input/output means is smaller than the other width(s) in the direction orthogonal to the light-traveling direction of at least one of the second and third optical input/output means.

[Invention VIII-a]

In Invention VIII-a, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein a width in a direction orthogonal to the light-traveling direction of the third optical input/output means is different from another width in the direction orthogonal to the light-traveling direction of the second optical input/output means.

[Invention VIII-b]

In the above Inventions I-VIII except for the Invention V, half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide.

[Invention IX]

In Invention IX, the half of the distance between respective centers of input/output ends of the second and third optical input/output means connected to the fifth multi-mode optical waveguide is larger than the other distance between the center line between the respective centers of the input/output ends of the second and third optical input/output means, and the center of the input/output end of the first optical input/output means connected to the fourth multi-mode optical waveguide.

In the Invention IX having the above-stated configuration, a distance between the second and third optical input/output means can be increased. Generally, since the second and third optical input/output means are arranged extremely close to each other, if each of these optical input/output means is made of an optical waveguide, the gap between the second and third optical input/output means becomes too small. Thus, an influence on characteristics of the optical system due to production variation becomes large. However, according to the Invention IX, this problem can be avoided so that a production of an optical waveguide having stable characteristics can be achieved.

Further, in the invention IX, an advantage of ensuring high light-propagating efficiency due to enhanced flexibility of design is obtained. Still further, in the Invention IX, the respective optical input/output means are not aligned in line with each other so that possibility of causing a harmful signal, namely, possibility that light is leaked from one of the optical input/output means and enters into the other optical input/output means can be reduced.

[Invention IX-a]

In invention IX-a, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein a center line of the fourth multi-mode optical waveguide extending in the light-traveling direction is offset relative to another center line of the fifth multi-mode optical waveguide extending in the light-traveling direction.

[Invention IX-b]

In Invention IX-b, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; and wherein a center line of the fourth multi-mode optical waveguide extending in the light-traveling direction is offset relative to another center line between the respective centers of the input/output ends of the second and third optical input/output means connected to the fifth multi-mode optical waveguide.

[Invention X]

In Invention X, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; wherein the optical filter is adapted to allow a first transmitting light and a second transmitting light to be transmitted therethrough and to allow a third reflecting light to be reflected thereat; wherein the first transmitting light input from the first optical input/output means is transmitted to the second optical input/output means and is restricted to be transmitted to the first and third optical input/output means; wherein the third reflecting light input from the second optical input/output means is transmitted to the third optical input/output means and is restricted to be transmitted to the first and second optical input/output means; and wherein the second transmitting light input from the second optical input/output means is transmitted to the first optical input/output means and is restricted to be transmitted to the second and third optical input/output means.

In the present specification, the wording "light is transmitted to an A optical input/output means and is restricted to be transmitted to a B input/output means" means that light transmitted to the B optical input/output means is sufficiently restricted as compared with that transmitted to the A optical input/output means. Specifically, a ratio of an amount of light transmitted to the A optical input/output means relative to the B optical input/output means depends on a type of signal, a transmission or propagation distance and other factors and, preferably, is 10 dB or more. More preferably, it is 25 dB or more.

The optical system with waveguides according to the Invention X is located on a side of a home in a FTTH (Fiber to the Home) system. Specifically, the first optical input/output means thereof is connected to an optical network unit (ONU), the second optical input/output means thereof is connected to an optical-fiber extending from a side of a central office, and the third optical input/output means thereof is connected to a video-ONU (V-ONU). Thus, a system capable of simultaneously receiving both data communication and video delivery signals through a single optical fiber can be obtained. In this case, the above structural feature makes it possible to reduce an amount of loss of the data signals and suppress a degree of data signals which comes to be mixed with the video signals.

Further, in the Invention X, light entering an optical input/output means can be efficiently transmitted to another predetermined optical input/output means so that optical communications can be achieved with a high light use efficiency and a high light-signal-transfer accuracy.

[Invention XI]

In the Invention XI, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; wherein the optical filter is adapted to allow a first transmitting light and a second transmitting light to be transmitted therethrough and to allow a third reflecting light to be reflected thereat; wherein the second transmitting light input from the first optical input/output means is transmitted to the second optical input/output means and is restricted to be transmitted to the first and third optical input/output means; wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means.

The optical system with waveguides according to the Invention XI is located on a side of a central office in a FTTH system. Specifically, the first optical input/output means thereof is connected to an optical line terminal (OLT), the second optical input/output means thereof is connected to an optical-fiber extending from a side of a home, and the third optical input/output means thereof is connected to a video-OLT (V-OLT). Thus, a system capable of simultaneously transferring both bidirectional data communication and video delivery signals through a single optical fiber can be obtained. In this case, the above structural feature makes it possible to reduce an amount of loss of the data signals and suppress an adverse effect on transmission of the video signals due to the data signals.

Further, in the Invention XI, light entering an optical input/output means can be efficiently transmitted to another predetermined optical input/output means so that optical communications can be achieved with a high light use efficiency and a high light-signal-transfer accuracy.

[Invention XII]

In the Invention XII, an optical system with waveguides comprises a pair of the optical system according to the Invention X and XI; wherein the respective second optical input/output means of the optical systems according to the Invention X and XI are optically connected to each other through such as an optical fiber.

[Invention XIII]

In the Invention XIII, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; wherein the optical filter is adapted to allow a first reflecting light and a second reflecting light to be reflected thereat and to allow a third transmitting light to be transmitted therethrough; wherein the second reflecting light input from the second optical input/output means is transmitted to the third optical input/output means and is restricted to be transmitted to the first and second optical input/output means; wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means.

The optical system with waveguides according to the Invention XIII is located on a side of a home in a FTTH system. Specifically, the third optical input/output means thereof is connected to an ONU, the second optical input/output means thereof is connected to an optical-fiber extending from a side of a central office, and the first optical input/output means thereof is connected to a video-ONU (V-ONU). Thus, a system capable of simultaneously receiving both data communication and video delivery signals through a single optical fiber can be obtained. In this case, the above structural feature makes it possible to reduce an amount of loss of the video signals and suppress a degree of the data signals which comes to be mixed with the video signals.

Further, in the Invention XIII, light entering an optical input/output means can be efficiently transmitted to another predetermined optical input/output means so that optical communications can be achieved with a high light use efficiency and a high light-signal-transfer accuracy.

[Invention XIV]

In the Invention XIV, an optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; wherein the optical filter is adapted to allow a first reflecting light and a second reflecting light to be reflected thereat and to allow a third transmitting light to be transmitted therethrough; wherein the third transmitting light input from the first optical input/output means is transmitted to the second optical input/output means and is restricted to be transmitted to the first and third optical input/output means; wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means.

The optical system with waveguides according to the Invention XIV is located on a side of a central office in a FTTH (Fiber to the Home) system. Specifically, the third optical input/output means thereof is connected to an optical line terminal (OLT), the second optical input/output means thereof is connected to an optical-fiber extending from a side of a home, and the first optical input/output means thereof is connected to a video-OLT (V-OLT). Thus, a system capable of simultaneously transferring both bidirectional data communication and video delivery signals through a single optical fiber can be obtained. In this case, the above structural feature makes it possible to reduce an amount of loss of the video signals and suppress an adverse effect on transmission of the video signals due to the data signals.

Further, in the Invention XIV, light entering an optical input/output means can be efficiently transmitted to another predetermined optical input/output means so that optical communications can be achieved with a high light use efficiency and a high light-signal-transfer accuracy.

[Invention XV]

In the Invention XV, an optical system with waveguides comprises a pair of the optical system according to the Invention XIII and XIV; wherein the respective second optical input/output means of the optical systems according to the Invention XIII and XIV are optically connected to each other through such as an optical fiber.

[Invention XVI]

In the Invention XVI, an optical system with waveguides comprises a pair of the optical system according to the Invention X and XIV; wherein the respective second optical input/output means of the optical systems according to the Invention X and XIV are optically connected to each other through such as an optical fiber.

[Invention XVII]

In the Invention XVII, an optical system with waveguides comprises a pair of the optical system according to the Invention XI and XIII; wherein the respective second optical input/output means of the optical systems according to the Invention XI and XIII are optically connected to each other through such as an optical fiber.

[Invention XVIII]

In the Invention XVIII, An optical system with waveguides comprises a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides; wherein the first optical input/output means is connected to an end face of the fourth multi-mode optical waveguide on a side thereof opposite to the optical-filter mounting means; wherein each of the second and third optical input/output means is connected to an end face of the fifth multi-mode optical waveguide on a side opposite to the optical-filter mounting means; wherein $L_4$ is a length in the light-traveling direction of the fourth multi-mode optical waveguide, $L_5$ is a length in the light-traveling direction of the fifth multi-mode optical waveguide, $100\ \mu m \leq L_4+L_5 \leq 800\ \mu m$, and $50\ \mu m \leq L_5 \leq 400\ \mu m$.

Regarding the Invention XVIII, when $L_5$ is less than $50\ \mu m$, light coupling/splitting performance in the multi-mode optical waveguide is insufficient, and light to be transmitted through the fifth multi-mode optical waveguide and reflected at the optical filter cannot be appropriately transmitted. Moreover, an insertion loss between the second and third optical input/output means is increased and return light is also increased so that the optical system becomes unstable.

When $L_5$ is greater than $400\ \mu m$, a length of an optical waveguide element including the multi-mode optical waveguide is increased. This increases transmitting loss of the optical system.

When $L_4+L_5$ is less than $100\ \mu m$, light coupling/splitting performance in the multi-mode optical waveguide is insufficient, and light to be transmitted through the fourth and fifth multi-mode optical waveguides cannot be appropriately transmitted.

When $L_4+L_5$ is greater than $800\ \mu m$, a length of an optical waveguide element including the multi-mode optical waveguides is increased. This increases transmitting loss of the optical system.

In the Invention XVIII, a length of the multi-mode optical waveguides in the light-traveling direction can be reduced so as to obtain a compact-size optical system. Further, efficient mass production is allowed to reduce a cost of manufacturing the optical system.

[Invention XIX]

In the above Inventions I-XVIII, each of the first, second and third optical input/output means is preferably a single-mode optical waveguide.

[Invention XX]

In the above Inventions I-XVIII, the first optical input/output means is preferably an optical fiber, and each of the second and third optical input/output means is preferably a single-mode optical waveguide.

[Invention XXI]

An optical coupling/splitting device according to the Invention XXI comprises an optical filter mounted to the optical-filter mounting means of the optical system according to the Inventions I-XX.

The optical filter may be a wavelength-selective filter for transmitting only light having (a) desired wavelength(s) therethrough, a mirror, half mirror, or a light-absorbing filter capable of adjusting a light absorption power, for example, by applying an electric field thereto.

According to the optical system with waveguides of the present invention, a size thereof can be reduced without increasing a production cost thereof, as compared with conventional optical coupling/splitting devices. Due to the reduction of the size, for example, a number of products made from one substrate can be advantageously increased.

In addition, the optical system with waveguides of the present invention makes it possible to ensure high light-transmitting efficiency thereof while suppressing light leakage between the optical waveguides so that an optical system with waveguides capable of highly-accurate optical communications can be provided.

Furthermore, the optical system with waveguides of the present invention prevents problems that light having a certain wavelength and intended to be output through an end of an input/output means causes a radiation loss to worsen insertion loss of the optical system, and that light having another wavelength and intended not to be output through an end of another input/output means leaks thereinto to deteriorate an isolation property of the optical system.

BRIEF DESCRIPTION OF THE DRAWINGS

FIG. 17 a schematic plan view showing a cross-type optical coupling/splitting device which is a third application of the optical system according to the present invention.

FIG. 18 a schematic plan view showing an optical switch which is a fourth application of an optical system according to the present invention.

DETAILED DESCRIPTION OF THE PREFERRED EMBODIMENTS

A preferred embodiment of the present invention will now be explained based on the drawings.

First Embodiment

In the optical system with waveguides in the prior art disclosed in the Patent Publication 3, the MMI section has a constant width. In an optical system with waveguides according to a first embodiment of the present invention, MMI sections on both sides of a thin-film optical device are designed so that respective widths of the MMI sections are different from each other.

Performance of a structure formed by simply combining the conventional MMI section with a thin-film optical device is poor, because, at a groove portion for inserting the thin-film optical device, there is no cladding in an up-down direction and a left-right direction relative to a core, which is different from the adjacent MMI sections, so that an effect of confining light or lightwave is very small. This causes perturbation of a field of light or lightwave, and this perturbation would have influence on a field configuration of convergent light at an output end of the MMI section. The first embodiment of the present invention solves this problem by optimizing the structure of the MMI section to correct the perturbed field of transmitting-light in the MMI section, or by arranging an input optical waveguide and an output optical waveguide in conformity to the perturbed field configuration, namely, a convergent position of the convergent light. In other words, the width of the MMI section is adjusted so that a perturbed field configuration of transmitting light or reflected light after the thin-film optical device is inserted into the MMI section is brought close to the field configuration of light before the thin-film optical device is inserted into the MMI section.

An optical system with waveguides 10 according to a first embodiment of the present invention has features in that respective widths, in a direction orthogonal to a light-traveling direction, of a fourth multi-mode optical waveguide and a fifth multi-mode optical waveguide are different from each other, and in that half of a distance between respective centers of input/output ends of a second and third optical input/output (I/O) means connected to the fifth multi-mode waveguide is different from a distance between a center of an input/output end of a first optical input/output (I/O) means connected to the fourth multi-mode waveguide and a center line between the respective centers of the input/output ends of the second and third optical input/output means.

Figure 1:
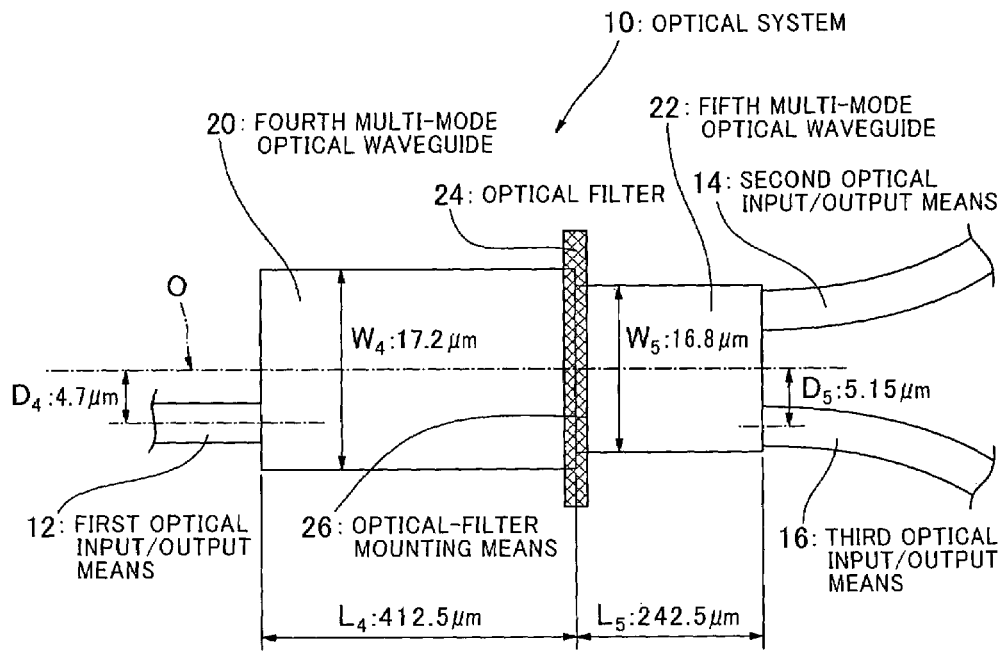
FIG. 1 is a schematic view showing an optical system with waveguides according to a first embodiment of the present invention.

As shown in FIG. 1, the optical system with waveguides 10 according to the first embodiment of the present invention comprises a first optical input/output means 12, a second optical input/output means 14, a third optical input/output means 16, a fourth multi-mode optical waveguide 20 and a fifth multi-mode optical waveguide 22, the multi-mode waveguides 20, 22 being capable of propagating light with plural propagation modes, and optical-filter mounting means 26 for mounting an optical filter 24 between the fourth and fifth multi-mode waveguides 20, 22 across the light-traveling direction in the fourth and fifth multi-mode optical waveguides 20, 22. The first input/output means 12 is connected to an end face of the fourth multi-mode optical waveguide 20 on a side thereof opposite to the optical-filter mounting means 26, and the second and third optical input/output means 14, 16 are connected to an end face of the fifth multi-mode optical waveguide 22 on a side thereof opposite to the optical-filter mounting means 26.

Each of the first, second and third optical input/output means 12, 14, 16 is a single-mode optical waveguide. Alternatively, the first optical input/output means 12 may be an optical fiber.

A length in the light-traveling direction of the fourth multi-mode optical waveguide 20 is refereed to $L_4$; a width in a direction orthogonal to the light-traveling direction of the fourth multi-mode optical waveguide 20 is referred to $W_4$; a length in the light-traveling direction of the fifth multi-mode optical waveguide 22 is referred to $L_5$; and a width in the direction orthogonal to the light-traveling direction of the fifth multi-mode optical waveguide 22 is referred to $W_5$.

Half of a distance between respective centers (or center lines) of input/output ends of the second and third optical input/output means 14, 16 connected to the fifth multi-mode optical waveguide 22 is referred to $D_5$. Further, a distance between a center of an input/output end of the first optical input/output means 12 connected to the fourth multi-mode optical waveguide 20, and a center line O between the respective centers of the input/output ends of the second and third optical input/output means 14, 16 is referred to $D_4$. In the first embodiment, the center line O conforms to respective axes or center lines of the fourth and fifth multi-mode optical waveguides 20, 22.

The optical filter 24 may be a dielectric multilayer-film filter 24 formed so that, when light is input thereinto at an incident angle of zero degree, light having a first wavelength of 1.31 μm or a second wavelength of 1.49 μm is transmitted while light having a third wavelength of 1.55 μm is reflected. This type of optical filter 24 may be used in the optical system with waveguides of the aforementioned Inventions X, XI and XII.

The optical filter has a thickness of 25 μm. A substrate is a glass substrate having a thickness of 0.1-1.0 mm or a polyimide substrate having a thickness of 5-10 μm. The optical filter can be made without using a substrate, namely, such an optical filter may also be used for the present invention.

Alternatively, the optical filter 24 may be a dielectric multilayer-film filter 24a formed so that, when light is input thereinto at an incident angle of zero degree, light having a first wavelength of 1.31 μm and a second wavelength of 1.49 μm is reflected while light having a third wavelength of 1.55 μm is transmitted. This type of optical filter 24 may be used in the optical system with waveguides of the aforementioned Inventions XIII, XIV, and XV.

Specific dimensions of the optical system with waveguides according to the first embodiment are as follows;

the length $L_4$ in the light-traveling direction of the fourth multi-mode optical waveguide 20 is 412.5 μm;

the length $L_5$ in the light-traveling direction of the fifth multi-mode optical waveguide 22 is 242.5 μm;

the width $W_4$ in the direction orthogonal to the light-traveling direction of the fourth multi-mode optical waveguide 20 is 17.2 μm;

the width $W_5$ in the direction orthogonal to the light-traveling direction of the fifth multi-mode optical waveguide 22 is 16.8 m;

the distance $D_4$ between the center of the input/output end of the first optical input/output means 12 connected to the fourth multi-mode optical waveguide 20, and the center line O between the respective centers of the input/output ends of the second and third optical input/output means 14, 16 connected to the fifth multi-mode optical waveguide 22 is 4.7 μm;

half D5 of the distance between the respective centers of the input/output ends of the second and third optical input/output means 14, 16 connected to the fifth multi-mode optical waveguide 22 is 5.15 μm; and the width in the direction orthogonal to the light-traveling direction of each of the first, second and third optical input/output means 12, 14, 16 is 6.2 μm.

Values of excess loss of the waveguides in the optical system with waveguides 10 according to the first embodiment are as follows;

a value of excess loss of light having a wavelength of 1.31 μm and transmitting from the first light I/O means to the second light I/O means is −0.6 dB;

a value of excess loss of light having a wavelength of 1.31 μm and transmitting from the first light I/O means to the third light I/O means is −49 dB; and a value of excess loss of light having a wavelength of 1.49 μm and transmitting from the second light I/O means to the first light I/O means is −0.6 dB.

Second Embodiment

In a second embodiment, widths of the MMI sections on the opposed sides of the thin-film optical device are the same.

Further, the input optical waveguide and the output optical waveguide in the second embodiment are asymmetric to each other relative to the axis of the MMI section, which is different from those in the prior art which define a symmetric positional relationship.

Figure 2:
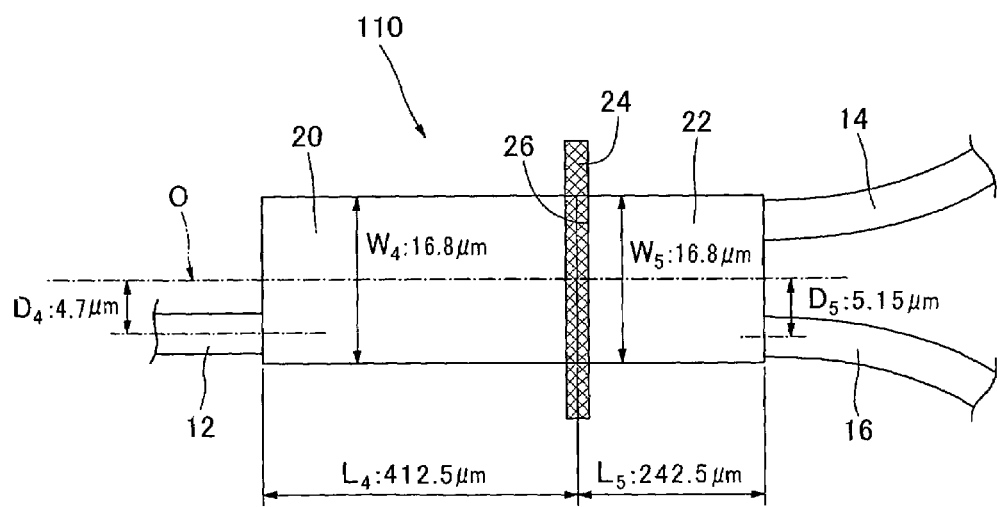
FIG. 2 is a schematic view showing an optical system with waveguides according to a second embodiment of the present invention.

FIG. 2 shows an optical system with waveguides 110 according to the second embodiment of the present invention. The same reference numbers are attached to components of the optical system 110 of the second embodiment similar to the components of the optical system 10 of the first embodiment as the reference numbers attached to the latter components, and explanation of the former components will be omitted.

An optical system with waveguides 110 according to the second embodiment of the present invention has features in that widths W in the light-traveling direction of the fourth and fifth multi-mode optical waveguides are the same, and in that half $D_5$ of the distance between respective centers of input/output ends of second and third optical input/output means connected to the fifth multi-mode optical waveguide is different from a distance $D_4$ between a center of an input/output end of a first optical input/output means connected to the fourth multi-mode optical waveguide, and a center line between the respective centers of the input/output ends of the second and third optical input/output means connected to the fifth multi-mode optical waveguide.

Specific dimensions of the optical system with waveguides 110 according to the second embodiment are as follows;

the width $W_4$ in the direction orthogonal to the light-traveling direction of the fourth multi-mode optical waveguide 20 is 16.8 μm;

the width $W_5$ in the direction orthogonal to the light-traveling direction of the fifth multi-mode optical waveguide 22 is 16.8 μm;

the distance $D_4$ between the center of the input/output end of the first optical input/output means 12 connected to the fourth multi-mode optical waveguide 20, and the center line between the respective centers of the input/output ends of the second and third optical input/output means 14, 16 connected to the fifth multi-mode optical waveguide 22 is 4.7 µm; and half $D_5$ of the distance between the respective centers of the input/output ends of the second and third optical input/output means 14, 16 connected to the fifth multi-mode optical waveguide 22 is 5.15 µm.

The remaining arrangement and dimensions are the same as those in the first embodiment.

Values of excess loss of the waveguides in the optical system with waveguides 110 according to the second embodiment are as follows;

a value of excess loss of light having a wavelength of 1.31 µm and transmitting from the first light I/O means to the second light I/O means is −0.7 dB;

a value of excess loss of light having a wavelength of 1.31 µm and transmitting from the first light I/O means to the third light I/O means is −29 dB; and a value of excess loss of light having a wavelength of 1.49 µm and transmitting from the second light I/O means to the first light I/O means is −0.7 dB.

Third Embodiment

Figure 3:
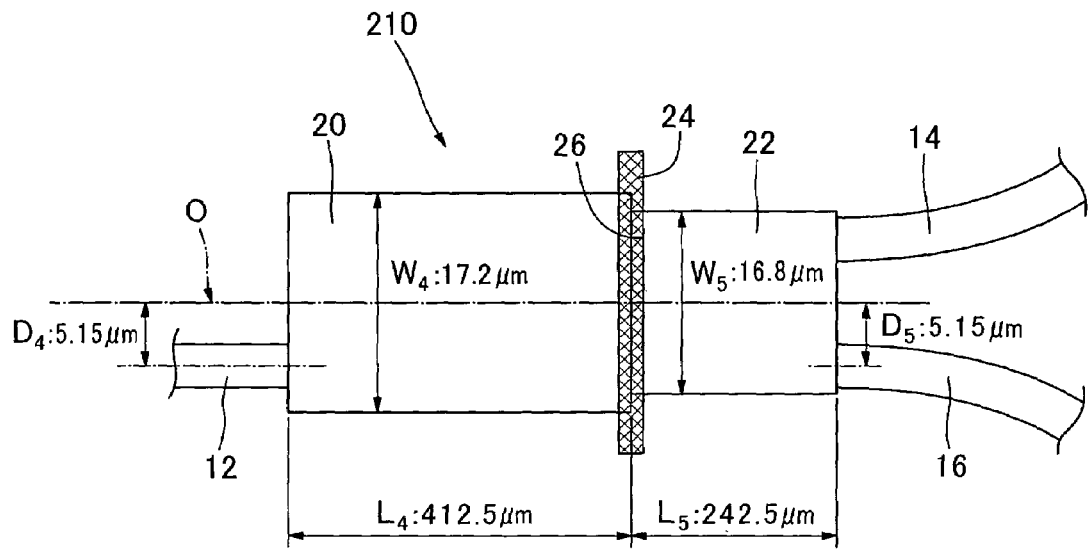
FIG. 3 is a schematic view showing an optical system with waveguides according to a third embodiment of the present invention.

FIG. 3 shows an optical system with waveguides 210 according to the third embodiment of the present invention. The same reference numbers are attached to components of the optical system 210 of the third embodiment similar to the components of the optical system 10 of the first embodiment as the reference numbers attached to the latter components, and explanation of the former components will be omitted.

An optical system with waveguides 210 according to the third embodiment of the present invention has features in that respective widths, in a direction orthogonal to a light-traveling direction, of the fourth and fifth multi-mode optical waveguides are different from each other, and in that half $D_5$ of the distance between respective centers of the input/output ends of the second and third optical input/output means connected to the fifth multi-mode optical waveguide equals to the distance $D_4$ between a center of the input/output end of the first optical input/output means connected to the fourth multi-mode optical waveguide, and the center line between the respective centers of the input/output ends of the second and third optical input/output means connected to the fifth multi-mode optical waveguide.

Specific dimensions of the optical system with waveguides 210 according to the third embodiment are as follows;

the width $W_4$ in the direction orthogonal to the light-traveling direction of the fourth multi-mode optical waveguide 20 is 17.2 µm;

the width $W_5$ in the direction orthogonal to the light-traveling direction of the fifth multi-mode optical waveguide 22 is 16.8 µm;

the distance $D_4$ between the center of the input/output end of the first optical input/output means 12 connected to the fourth multi-mode optical waveguide 20, and the center line O between the respective centers of the input/output ends of the second and third optical input/output means 14, 16 connected to the fifth multi-mode optical waveguide 22 is 5.15 µm; and half $D_5$ of the distance between the respective centers of the input/output ends of the second and third optical input/output means 14, 16 connected to the fifth multi-mode optical waveguide 22 is 5.15 µm.

The remaining arrangement and dimensions are the same as those in the first embodiment.

Values of excess loss of the waveguides in the optical system with waveguides 210 according to the third embodiment are as follows;

a value of excess loss of light having a wavelength of 1.31 µm and transmitting from the first light I/O means to the second light U/O means is −0.9 dB;

a value of excess loss of light having a wavelength of 1.31 µm and transmitting from the first light I/O means to the third light I/O means is −26 dB; and a value of excess loss of light having a wavelength of 1.49 µm and transmitting from the second light I/O means to the first light I/O means is −0.7 dB.

Fourth Embodiment

Differently from the conventional optical system with waveguides, a width W of an input optical waveguide connected to MMI section and that of an output optical waveguide connected thereto are different from each other. Specifically, in a fourth embodiment, the output optical waveguide connected to the MMI section is adjusted to have a width adapted to a field configuration of light perturbed after it is transmitted through or reflected at a thin-film optical device mounted in the MMI section, i.e. to have a width different from that of the input optical waveguide connected to an input end face of the MMI section. In this manner, a coupling loss between the MMI section and the inlet/outlet port of the output optical waveguide can be reduced. For example, with a focus on light to be transmitted from the first optical input/output means 12 to the second optical input/output means 14, or light to be transmitted from the second optical input/output means 14 to the third optical input/output means 16, or light to be transmitted from the third optical input/output means 16 to the second optical input/output means 14, the pair of optical input/output means are designed to have different widths, and preferably an output-side one of them is designed to have a width greater than that of an inlet-side one of them.

Figure 4:
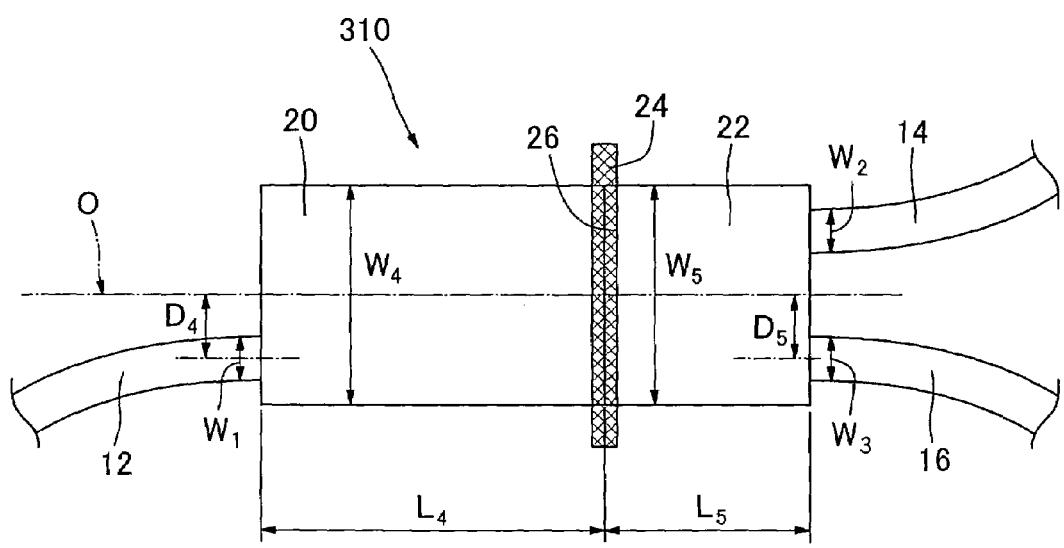
FIG. 4 is a schematic view showing an optical system with waveguides according to a fourth embodiment of the present invention.

FIG. 4 shows an optical system with waveguides 310 according to the fourth embodiment of the present invention. The same reference numbers are attached to components of the optical system 310 of the fourth embodiment similar to the components of the optical system 10 of the first embodiment as the reference numbers attached to the latter components, and explanation of the former components will be omitted.

An optical system with waveguides 310 according to the fourth embodiment of the present invention has a feature in that a width in a direction orthogonal to a light-traveling direction of the first optical input/output mean is different from at least one of respective widths in the direction orthogonal to the light-traveling direction of the second and third optical input/output mean. Preferably, half $D_5$ of the distance between respective centers of the input/output ends of the second and third optical input/output means connected to the fifth multi-mode optical waveguide is different from a distance $D_4$ between the center of the input/output end of the first optical input/output means connected to the fourth multi-mode optical waveguide, and the center line between the respective centers of the input/output ends of the second and third optical input/output means connected to the fifth multi-mode optical waveguide.

Specific dimensions of the optical system with waveguides 310 according to the fourth embodiment are as follows; wherein a width in a direction orthogonal to the light-traveling direction of the first optical input/output means 12 is referred to $W_1$; a width in a direction orthogonal to the light-traveling direction of the second optical input/output means 14 is referred to $W_2$; and a width in a direction orthogonal to the light-traveling direction of the third optical input/output means 16 is referred to $W_3$;

the width $W_1$ in the direction orthogonal to the light-traveling direction of the first optical input/output means is 6.2 μm;

the width $W_2$ in the direction orthogonal to the light-traveling direction of the second optical input/output means is 6.4 μm;

the width $W_3$ in the direction orthogonal to the light-traveling direction of the third optical input/output means is 6.4 μm;

the length $L_4$ in the light-traveling direction of the fourth multi-mode optical waveguide 20 is 445 μm;

the length $L_5$ in the light-traveling direction of the fifth multi-mode optical waveguide 22 is 274 μm;

the width $W_4$ in the direction orthogonal to the light-traveling direction of the fourth multi-mode optical waveguide 20 is 18.2 μm;

the width $W_5$ in the direction orthogonal to the light-traveling direction of the fifth multi-mode optical waveguide 22 is 18.2 μm;

the distance $D_4$ between the center of the input/output end of the first optical input/output means 12 connected to the fourth multi-mode optical waveguide 20, and the center line O between the respective centers of the input/output ends of the second and third optical input/output means 14, 16 connected to the fifth multi-mode optical waveguide 22 is 4.44 μm; and half $D_5$ of the distance between the respective centers of the input/output ends of the second and third optical input/output means 14, 16 connected to the fifth multi-mode optical waveguide 22 is 5.2 μm.

Values of excess loss of the waveguides in the optical system with waveguides 410 according to the fourth embodiment are as follows;

a value of excess loss of light having a wavelength of 1.31 μm and transmitting from the first light I/O means to the second light I/O means is −0.7 dB;

a value of excess loss of light having a wavelength of 1.31 μm and transmitting from the first light I/O means to the third light I/O means is −55 dB; and a value of excess loss of light having a wavelength of 1.49 μm and transmitting from the second light I/O means to the first light I/O means is −0.8 dB.

Fifth Embodiment

Figure 5:
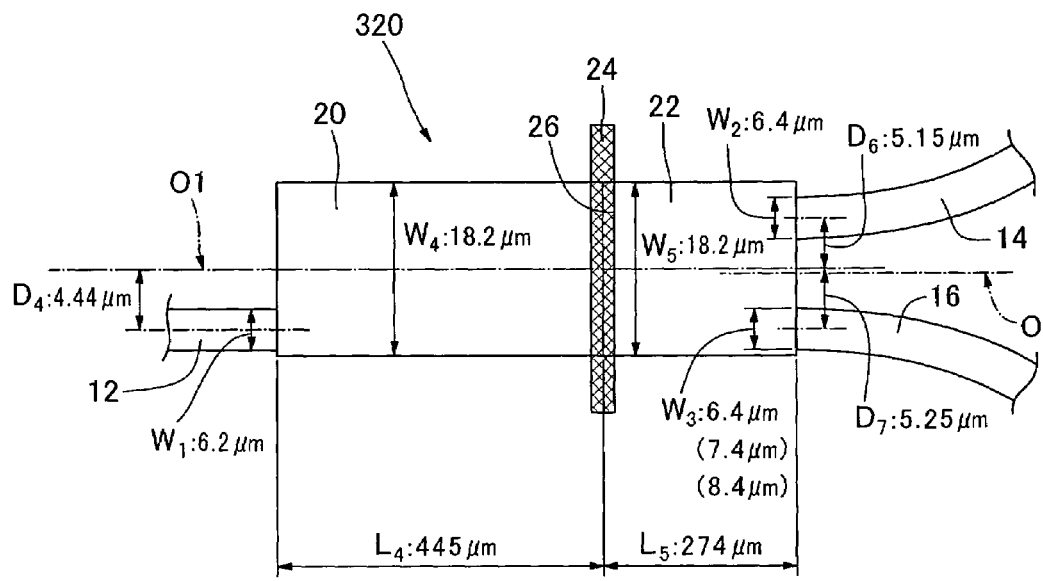
FIG. 5 is a schematic view showing an optical system with waveguides according to a fifth embodiment of the present invention.

FIG. 5 shows an optical system with waveguides 320 according to the fifth embodiment having a feature in that a distance $D_6$ between the center axis O1 of the fourth multi-mode optical waveguide 20 and the center of the input/output end of the second optical input/output means 14 is different from a distance $D_7$ between the center axis O1 of the fourth multi-mode optical waveguide 20 and the center of the input/output end of the third optical input/output means 16. The axis of the fifth multi-mode optical waveguide 22 is coaxial with the axis O1 of the fourth multi-mode optical waveguide 20.

Specific dimensions of the optical system with waveguides 320 according to the fifth embodiment are as follows;

the width $W_1$ in the direction orthogonal to the light-traveling direction of the first optical input/output means is 6.2 μm;

the width $W_2$ in the direction orthogonal to the light-traveling direction of the second optical input/output means is 6.4 μm;

the width $W_3$ in the direction orthogonal to the light-traveling direction of the third optical input/output means is 6.4 μm;

the length $L_4$ in the light-traveling direction of the fourth multi-mode optical waveguide 20 is 445 μm;

the length $L_5$ in the light-traveling direction of the fifth multi-mode optical waveguide 22 is 274 μm;

the width $W_4$ in the direction orthogonal to the light-traveling direction of the fourth multi-mode optical waveguide 20 is 18.2 μm;

the width $W_5$ in the direction orthogonal to the light-traveling direction of the fifth multi-mode optical waveguide 22 is 18.2 μm;

the distance $D_4$ between the axis O1 of the fourth and fifth multi-mode optical waveguides 20, 22 and the center of the input/output end of the first optical input/output means 12 connected to the fourth multi-mode optical waveguide 20 is 4.44 μm;

the distance $D_6$ between the axis O1 of the fourth and fifth multi-mode optical waveguides 20, 22 and the center of the input/output end of the second optical input/output means 14 connected to the fifth multi-mode optical waveguide 22 is 5.15 μm; and the distance $D_7$ between the axis O1 of the fourth and fifth multi-mode optical waveguides 20, 22 and the center of the input/output end of the third optical input/output means 16 connected to the fifth multi-mode optical waveguide 22 is 5.25 μm.

That is, in the fifth embodiment, a center line O between the respective centers of the input/output ends of the second and third optical input/output means 14 connected to the fifth multi-mode optical waveguide 22 is offset from the axis O1 of the fourth multi-mode optical waveguide 20.

Values of excess loss of the waveguides in the optical system with waveguides 320 according to the fifth embodiment is as follows;

a value of excess loss of light having a wavelength of 1.3 μm and transmitting from the first light I/O means to the second light I/O means is −0.7 dB;

a value of excess loss of light having a wavelength of 1.31 μm and transmitting from the first light I/O means to the third light I/O means is −55 dB;

a value of excess loss of light having a wavelength of 1.49 μm and transmitting from the second light I/O means to the first light I/O means is −0.8 dB;

a value of excess loss of light having a wavelength of 1.55 μm and transmitting from the second light I/O means to the third light I/O means is −0.4 dB; and a value of excess loss of light having a wavelength of 1.55 μm and transmitting from the second light I/O means to the second light P/O means is −43 dB.

As is evident from this embodiment, by defining the widths $D_6$ and $D_7$ different from each other, an amount of excess loss of the waveguides from the second input/output means 14 to the third input/output means 16 can be reduced.

Thus, the optical system with waveguides according to the fifth embodiment can be used in an access system type optical communications. Particularly, the optical system with waveguides is suitable for an optical communication system using the 1.31 μm waveband for an upstream data signal and the 1.49 μm waveband for a downstream video signal.

In this embodiment, only the width $W_3$ in the direction orthogonal to the light-traveling direction of the third optical input/output means 16 may be changed from 6.4 μm to 7.4 μm or 8.4 µm. For example, when $W_3=8.4$ µm, a core of the third optical input/output means 16 is arranged to protrude from a core of the fifth multi-mode optical waveguide 22 in a width direction (see FIG. 11). When light having a wavelength of 1.55 µm is transmitted from the second optical input/output means 14 to the third optical input/output means 16 under conditions that the width $W_3$ of the third optical input/output means 16 was increased to 7.4 µm and 8.4 µm, the excess loss was respectively reduced to 0.03 dB and 0.01 dB, as compared with the above embodiment. As is clear from this result, the width $W_3$ in the direction orthogonal to the light-traveling direction of the third optical input/output means 16 can be adjusted to further reduce the excess loss of light transmitted from the second optical input/output means 14 to the third optical input/output means 16.

Sixth Embodiment

Figure 6:
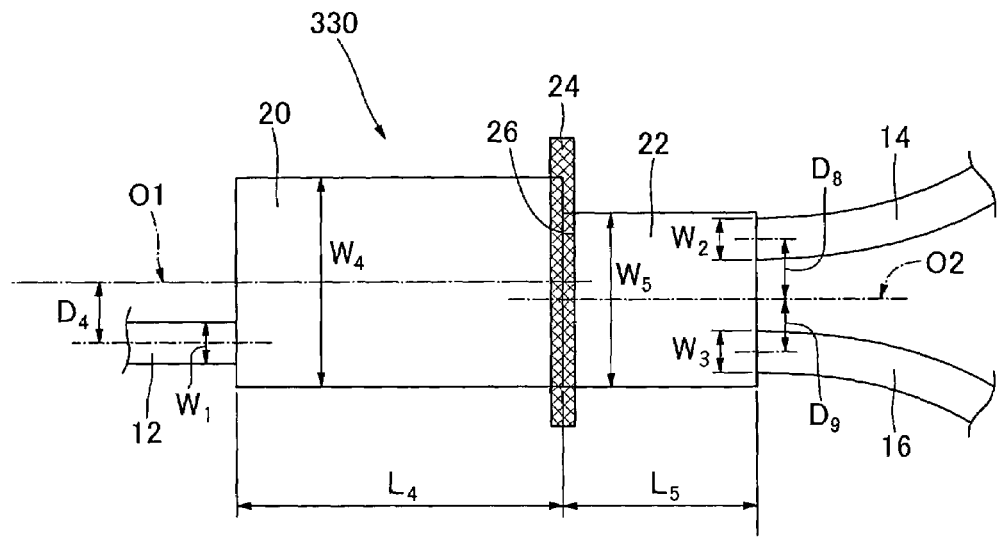
FIG. 6 is a schematic view showing an optical system with waveguides according to a sixth embodiment of the present invention.

FIG. 6 shows an optical system with waveguides 330 according to a sixth embodiment of the present invention. In the sixth embodiment, an axis O2 of a fifth multi-mode optical waveguide 22 is offset from an axis O1 of a fourth multi-mode optical waveguide 20 in a direction orthogonal to a light-traveling direction. Further, a distance $D_8$ between the axis O2 of the fifth multi-mode optical waveguide 22 and a center of an input/output end of the second optical input/output means 14 is different from a distance $D_9$ between the axis O2 of the fifth multi-mode optical waveguide 22 and a center of an input/output end of the third optical input/output means 16.

Seventh Embodiment

Figure 7:
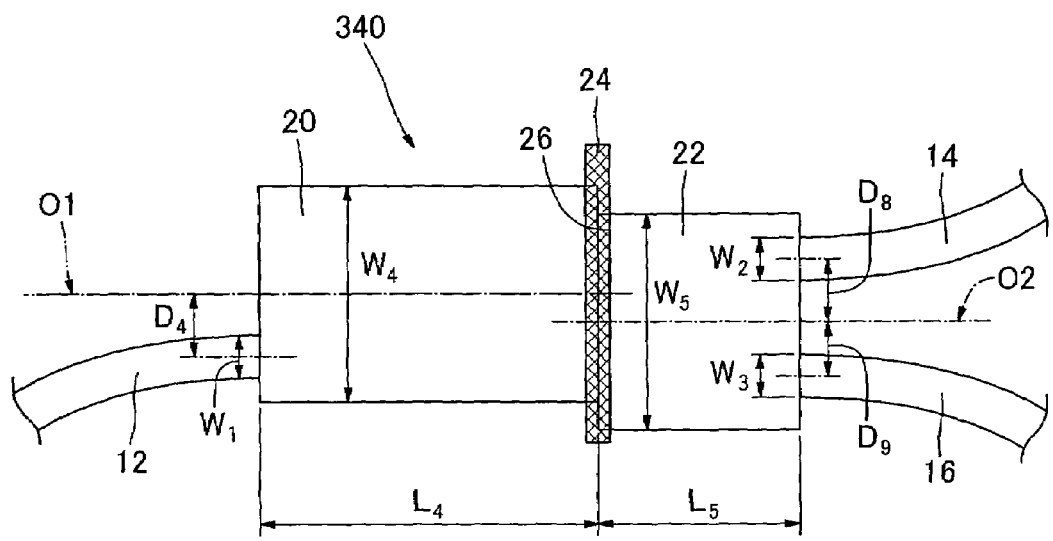
FIG. 7 is a schematic view showing an optical system with waveguides according to a seventh embodiment of the present invention.

FIG. 7 shows an optical system with waveguides 340 according to a seventh embodiment of the present invention. Similar to the optical system with waveguides 330 including the sixth embodiment, in the seventh embodiment, an axis O2 of the fifth multi-mode optical waveguide is offset from an axis O1 of a fourth multi-mode optical waveguide 20 in a direction orthogonal to a light-traveling direction, and a distance $D_8$ between the axis O2 of the fifth multi-mode optical waveguide 22 and a center of an input/output end of the second optical input/output means 14 is different from a distance $D_9$ between the axis O2 of the fifth multi-mode optical waveguide 22 and a center of an input/output end of the third optical input/output means 16. Further, the fifth multi-mode optical waveguide 22 is arranged to protrude from the fourth multi-mode optical waveguide 20 in an offset direction of the axis O2.

As in the sixth and seventh embodiments, the axis O2 of the fifth multi-mode optical waveguide can be offset from the axis O1 of the fourth multi-mode optical waveguide 20 to reduce a waveguide excess loss between the first and second optical input/output means 12, 14 and to increase a waveguide excess loss between the first and third optical input/output means 12, 16, namely, to suppress crosstalk.

[Design Process]

Figure 8:
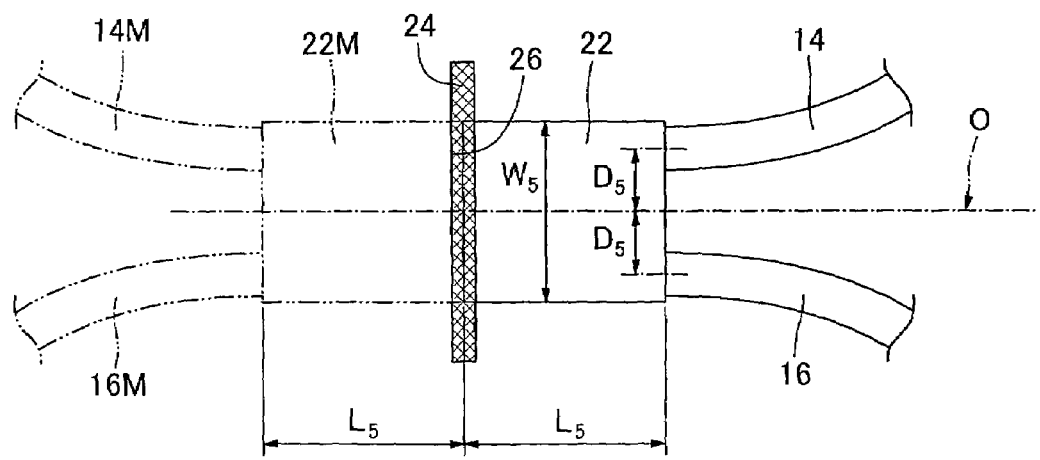
FIG. 8 is a schematic view for explaining a design process of an optical system with waveguides according to the present invention.

In a first step of a design process of the optical system with waveguides according to the first embodiment of the present invention, as illustrated in FIG. 8 which is a mirror image view of the fifth multi-mode optical waveguide, mirror images of the fifth multi-mode optical waveguide 22, a second optical input/output means 14 and a third input/output means 16, i.e., a fifth multi-mode-optical-waveguide mirror image 22M, a second-optical input/output-means mirror image 14M and a third-input/output-means mirror image 16M, are formed on the assumption that the optical filter 24 is a reflecting mirror. Then, in the mirror image of the fifth multi-mode optical waveguide illustrated in FIG. 8, a length $L_5$ in the light-traveling direction of the fifth multi-mode optical waveguide 22, a width $W_5$ in the direction orthogonal to the light-traveling direction of the fifth multi-mode optical waveguide 22, and half $D_5$ of a distance between respective centers (center lines) of input/output ends of the second and third optical input/output means 14, 16, are determined to allow a third light input from the second optical input/output means 14 and transmitted through the optical filter 24 to maximally enter the third-input/output-means mirror image 16M, and to minimally enter the second-optical input/output-means mirror image 14M.

Figure 9:
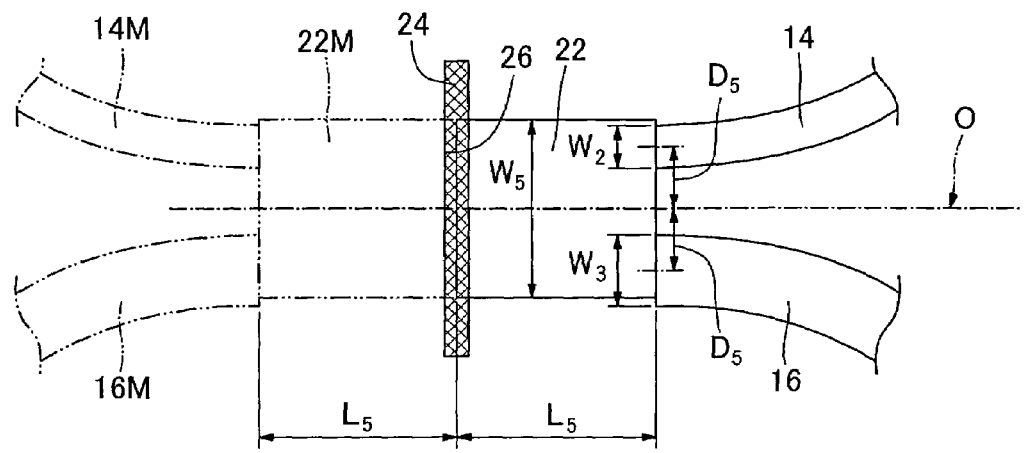
FIG. 9 is a schematic view for explaining a design process of an optical system with waveguides according to the present invention.

When it is necessary to increase intensity of the third light input from the second optical input/output means 14 and output from the third optical input/output means 16, a width $W_3$ in the direction orthogonal to the light-traveling direction of the third-input/output-means mirror image 16M (corresponding to the third optical input/output means 16) is additionally adjusted, for example, it is increased as shown in FIG. 9. In this manner, loss of light intensity to be transmitted from the second optical input/output means to the third optical input/output means can be further reduced.

On the contrary, when it is necessary to increase the intensity of the third light input from the third optical input/output means 16 and output from the second optical input/output means 16, a width $W_2$ in a direction orthogonal to the light-traveling direction of the second optical input/output means 14 is adjusted, for example, it is increased. In this manner, loss of light intensity to be transmitted from the third optical input/output means 16 to the second optical input/output means 14 can be further reduced.

Figure 10:
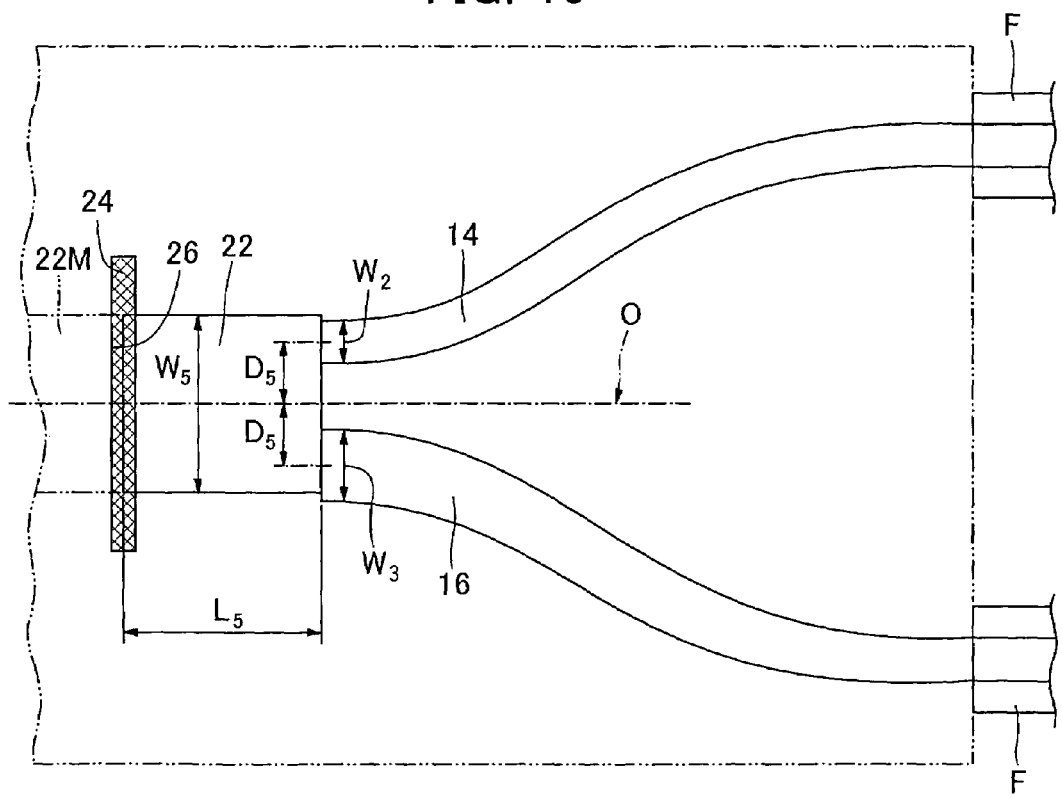
FIG. 10 is a schematic view for explaining a design process of an optical system with waveguides according to the present invention.

Preferably, in order to preventing coupling loss at a connection between an optical fiber and the second or third optical input/output means 14 or 16 from increasing due to the operation of adjusting the width in the direction orthogonal to the light-traveling direction of the second or third optical input/output means 14 or 16, the width in the direction orthogonal to the light-traveling direction of the second or third optical input/output means 14 or 16 is adjusted to conform to a diameter of the optical fiber at the connection with the optical fiber. For example, as shown in FIG. 10, when the width of the third optical input/output means 16 is increased at the connection with the fifth multi-mode optical waveguide 22, the width of the third optical input/output means 16 is gradually reduced toward the diameter of the optical fiber F.

Then, in addition to the determined dimensions, namely, the length $L_5$ in the light-traveling direction of the fifth multi-mode optical waveguide 22, the width $W_5$ in the direction orthogonal to the light-traveling direction thereof, and half $D_5$ of the distance between the respective centers (center lines) of the input/output ends of the second and third optical input/output means 14, 16, a first optical input/output means 12 and a fourth multi-mode optical waveguide 20 are formed, as shown in FIGS. 1-7. In this configuration, a length $L_4$ in the light-traveling direction of the fourth multi-mode optical waveguide 20, a width $W_4$ in the direction orthogonal to the light-traveling direction thereof, and a distance $D_4$ between a center of an input/output end of the first optical input/output means 12 connected to the fourth multi-mode optical waveguide 20, and a center line O between respective centers of input/output ends of the second and third optical input/output means 14, 16 connected to the fifth multi-mode optical waveguide 22, are determined to allow a first or second light input from the first optical input/output means 12 and reflected at the optical filter 24 to maximally enter the second input/output means 14 and to minimally enter the third optical input/output means 16.

Figure 11:
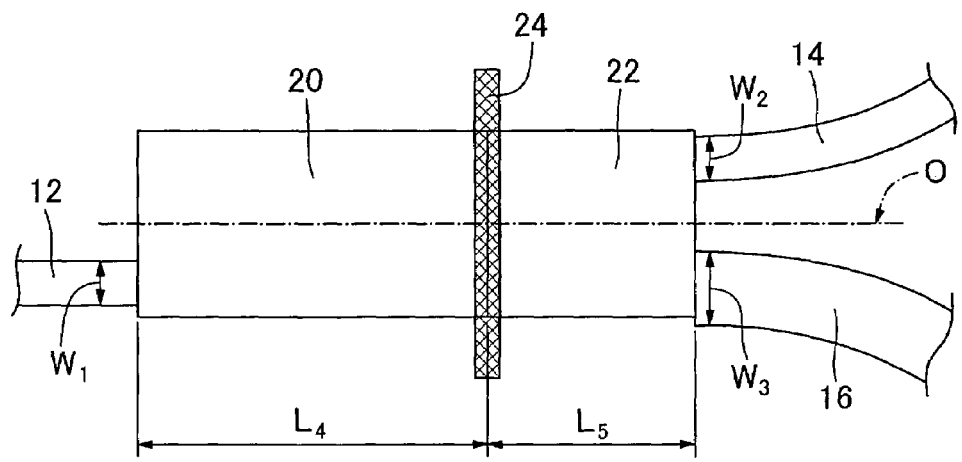
FIG. 11 is a schematic view for explaining a design process of an optical system with waveguides according to the present invention.
Figure 12:
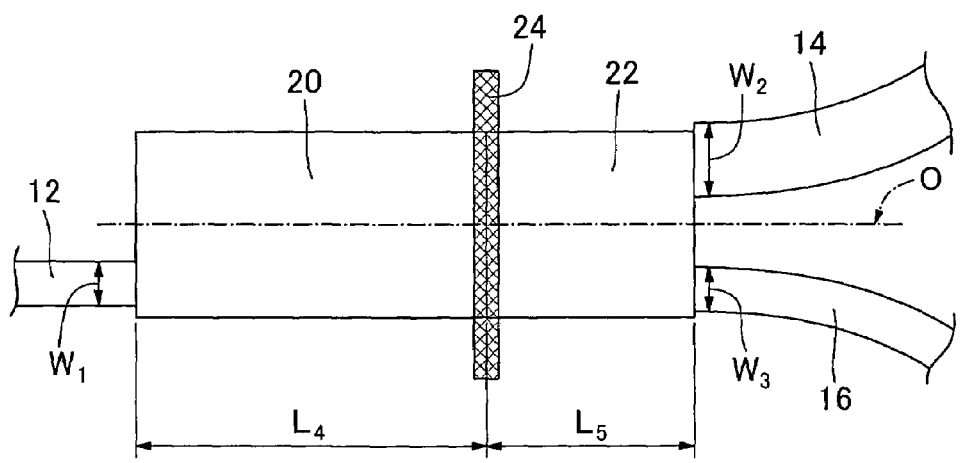
FIG. 12 is a schematic view for explaining a design process of an optical system with waveguides according to the present invention.

When a width $W_3$ of the third optical input/output means 16 is increased, for example, as shown in FIG. 11, the third optical input/output means 16 may protrude from a core of the fifth multi-mode optical waveguide 22 in a width direction. Similarly, when a width $W_2$ of the second optical input/output means 14 is increased, for example, as shown in FIG. 12, the second optical input/output means 14 may protrude from a core of the fifth multi-mode optical waveguide 22 in the width direction.

COMPARATIVE EXAMPLE

An optical system with waveguides 360 as a comparative example will be explained. In the comparative optical system, a width in a direction orthogonal to the light-transmitting direction of the fourth multi-mode optical waveguide equals to that of the fifth multi-mode optical waveguide, and half of a distance between respective centers of input/output ends of the second and third optical input/output means connected to the fifth multi-mode optical waveguide equals to a distance between a center of an input/output end of the first optical input/output means connected to the fourth multi-mode optical waveguide, and a center line between the respective centers of the input/output ends of the second and third optical input/output means connected to the fifth multi-mode optical waveguide.

Figure 13:
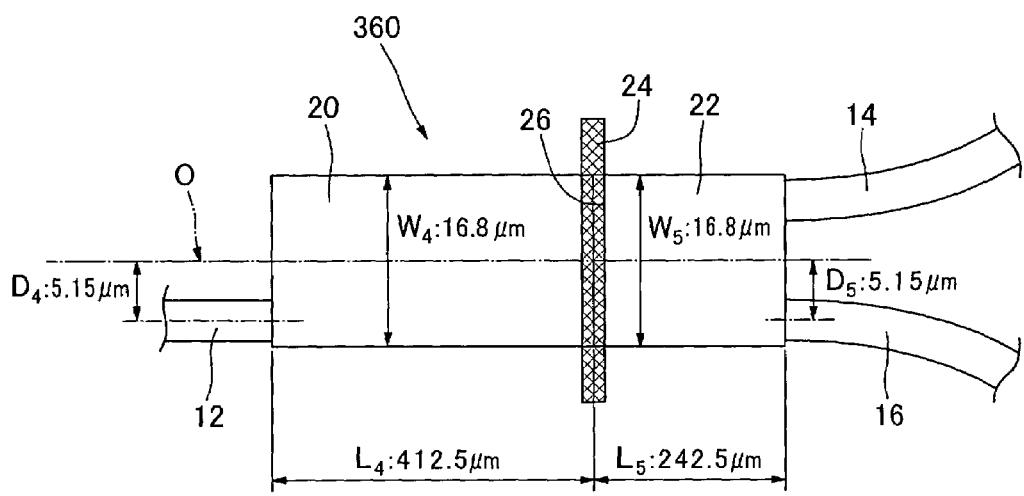
FIG. 13 is a schematic view showing an comparative example of a optical system with waveguides.

As shown in FIG. 13, the dimensions of the comparative optical system with waveguides 360 are as follows. Regarding components of the comparative optical system 360 which is the same as components in the optical system 10 according to the first embodiment of the present invention, the same reference numerals are attached to the former components as those of the latter components and explanations of the former components are omitted.

a width $W_4$ in the direction orthogonal to the light-traveling direction of the fourth multi-mode optical waveguide 20 is 16.8 μm;

a width $W_5$ in the direction orthogonal to the light-traveling direction of the fifth multi-mode optical waveguide 22 is 16.8 μm;

a distance $D_4$ between the center of the input/output end of the first optical input/output means 12 connected to the fourth multi-mode optical waveguide 20, and the center line O between the respective centers of the input/output ends of the second and third optical input/output means 14, 16 connected to the fifth multi-mode optical waveguide 22 is 5.15 μm; and half $D_5$ of the distance between the respective centers of the input/output ends of the second and third optical input/output means 14, 16 connected to the fifth multi-mode optical waveguide 22 is 5.15 μm.

a value of excess loss of light transmitting from the first light I/O means to the second light I/O means and having a wavelength of 1.31 μm is −0.9 dB;

a value of excess loss of light transmitting from the first light I/O means to the third light I/O means and having a wavelength of 1.31 μm is −26 dB; and a value of excess loss of light transmitting from the second light I/O means to the first light I/O means and having a wavelength of 1.49 μm is −0.9 dB.

[Influence of Positional Deviation of Optical-Filter Mounting Means]

Figure 14:
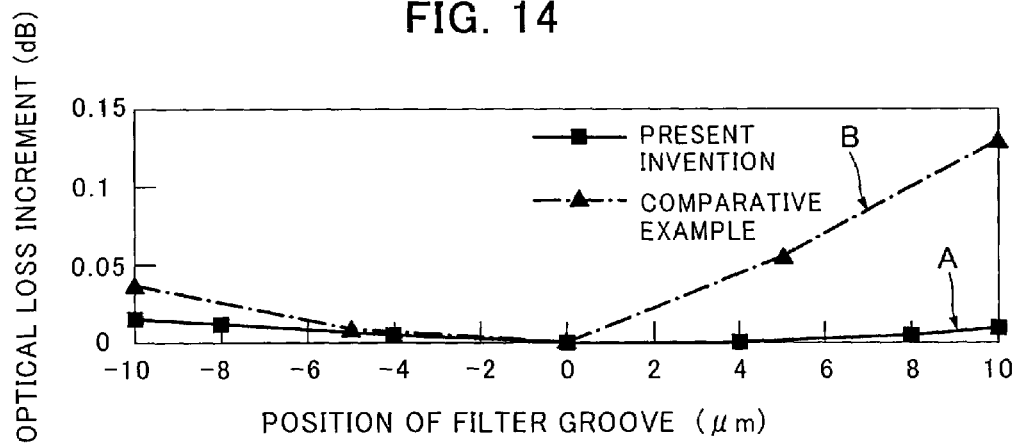
FIG. 14 is a graph showing an affection due to a shift of optical-filter mounting means

In the optical system with waveguides according to the present invention, positional deviation of the optical-filter mounting means has less impact on characteristics of the optical system than that on characteristics of the optical coupling/splitting device disclosed in the Patent Publication 2. Thus, the optical system with waveguides according to the present invention can readily produced at lower cost than that of the conventional optical coupling/splitting device. As shown in FIG. 14, the influence of positional deviation of the optical-filter mounting means is expressed by a graph where the horizontal axis represents an amount of deviation (μm) of the optical filter from the predetermined desired position, while the vertical axis represents an amount of optical loss increment (dB). The line A in FIG. 14 indicates data of the first embodiment of the present invention, while the line B therein indicates data of the optical coupling/splitting device disclosed in the Patent Publication 3.

Next, four applications of the optical system according to the present invention will be explained. In the following explanation, the applications exemplarily including the optical systems which is the first embodiment of the present invention will be explained.

Figure 15:
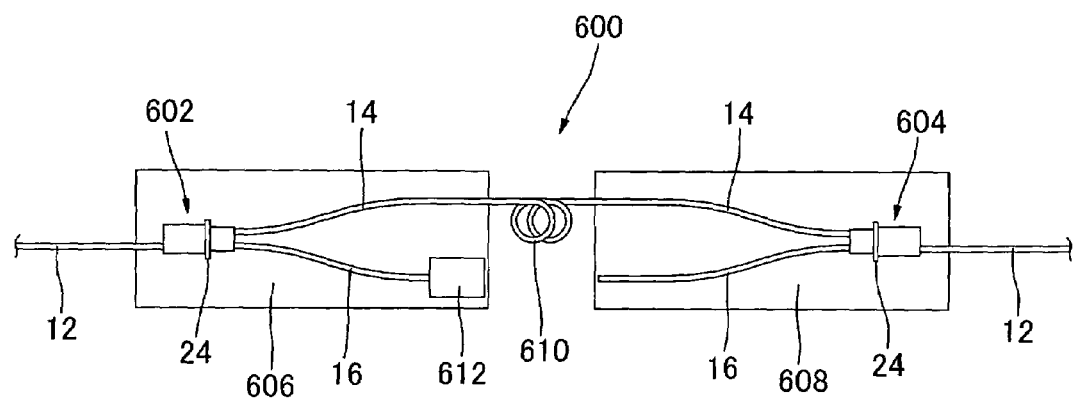
FIG. 15 is a schematic plan view showing an optical amplifier which is a first application of the optical system according to the present invention.

Firstly, referring to FIG. 15, an optical amplifier which is a first application of the optical system according to the present invention will be explained. FIG. 15 is a schematic top plan view of an optical amplifier using the optical system according to the present invention.

An optical amplifier 600 comprises two substrates 606, 608 respectively including the optical system 602, 604 according to the present invention. The second optical input/output means 14 of the first optical system 602 is connected to the second optical input/output means 14 of the second optical system 604 via a fiber amplifier 610 therebetween. For example, the fiber amplifier 610 is composed of an erbium-doped fiber having a length of 1 m. The third optical input/output means 16 of the first optical system 602 is connected to a pumping laser diode 612. The optical filter 24 of the first optical system 602 is selected to transmit light having a first wavelength and reflect light having a second wavelength.

In the above optical amplifier 600, regarding the first optical system 602, when light having the first wavelength is input through a first optical input/output means 12 and other light having third wavelength is input from the laser diode 612, these lights are coupled to each other and output through the second optical input/output means 14. The output lights are amplified by the-fiber amplifier 610. Regarding the second optical system 604, when the amplified lights are input through the second optical input/output means 14, they are split so that, for example, the amplified light having the first wavelength is output through the first optical input/output means 12.

Figure 16:
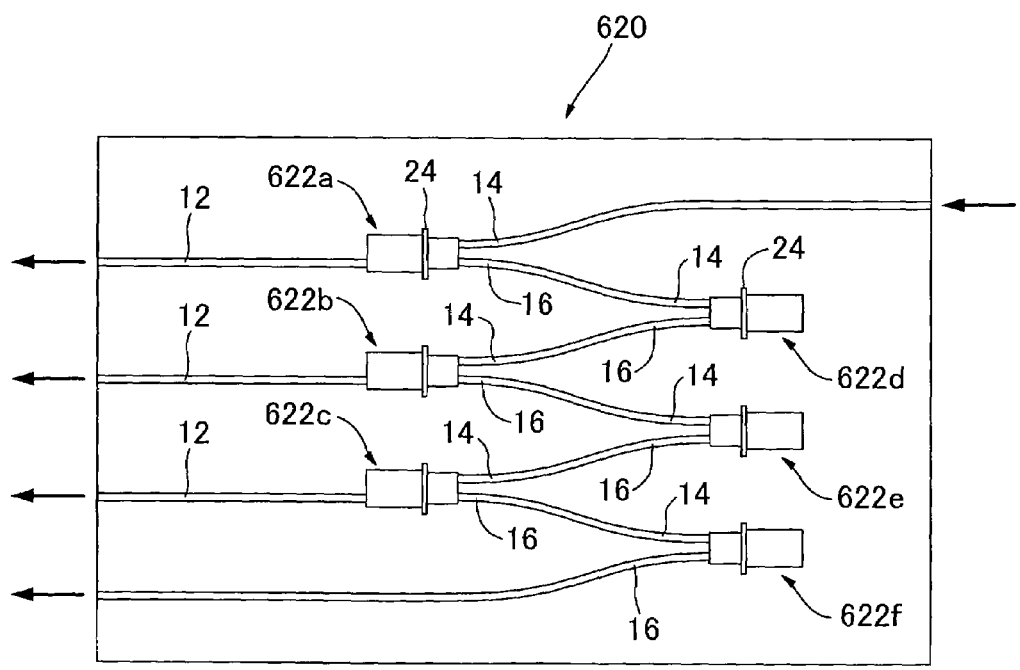
FIG. 16 a schematic plan view showing a CWDM receiver which is a second application of the optical system according to the present invention.
Figure 19:
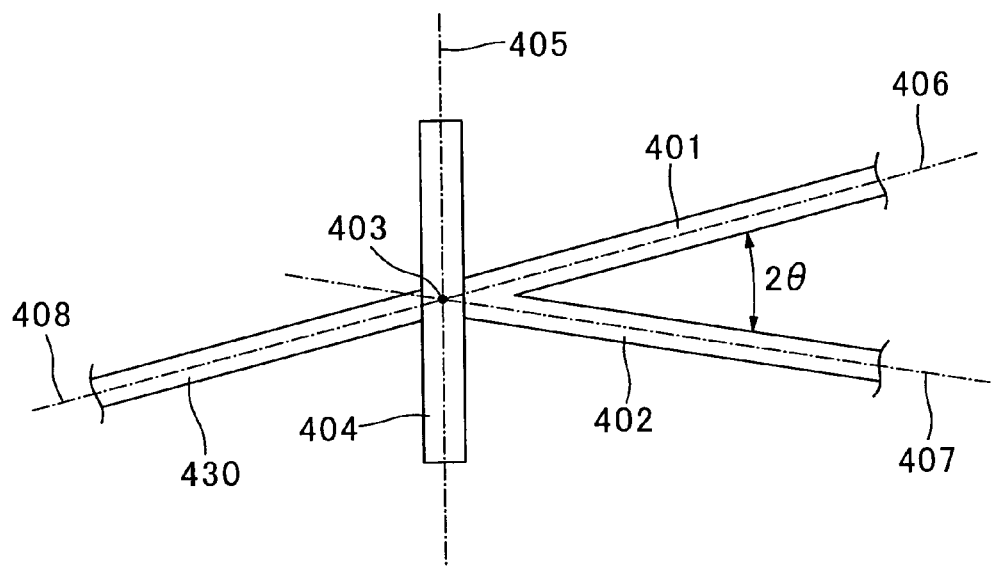
FIG. 19 is a schematic view for explaining an optical principle of an optical coupling/splitting device disclosed in the Patent Publication 1.
Figure 20:
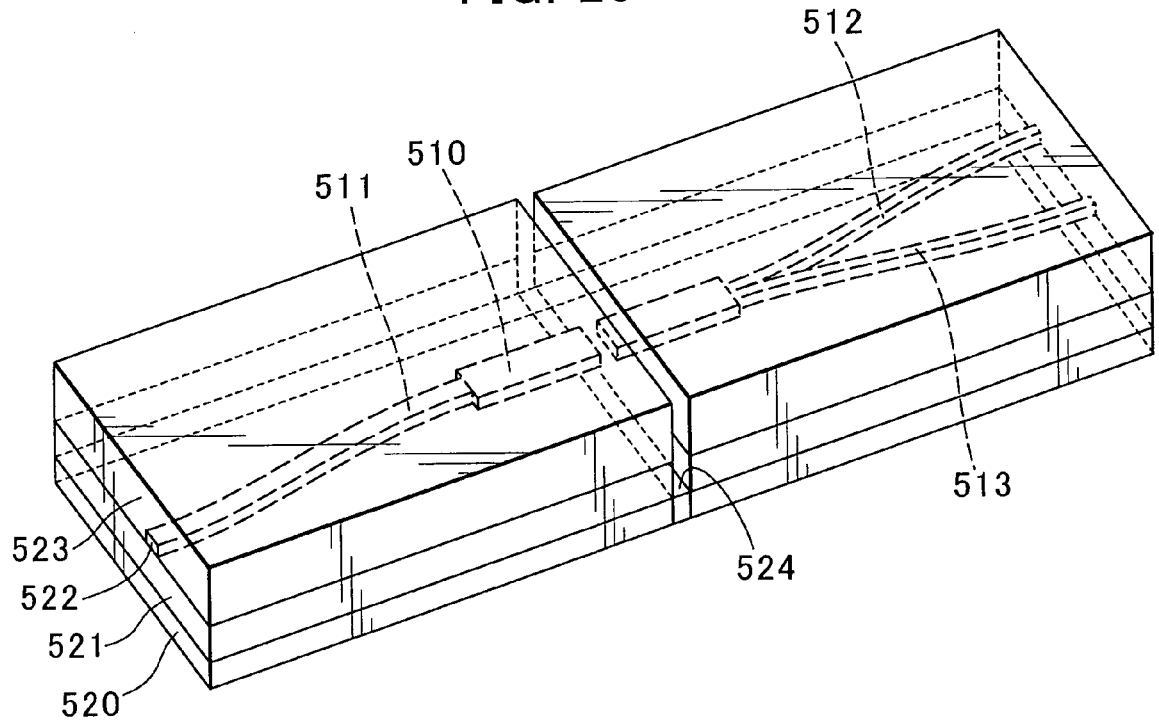
FIG. 20 is a schematic perspective view of an optical coupling/splitting device disclosed in the Patent Publication 3.
Figure 21:
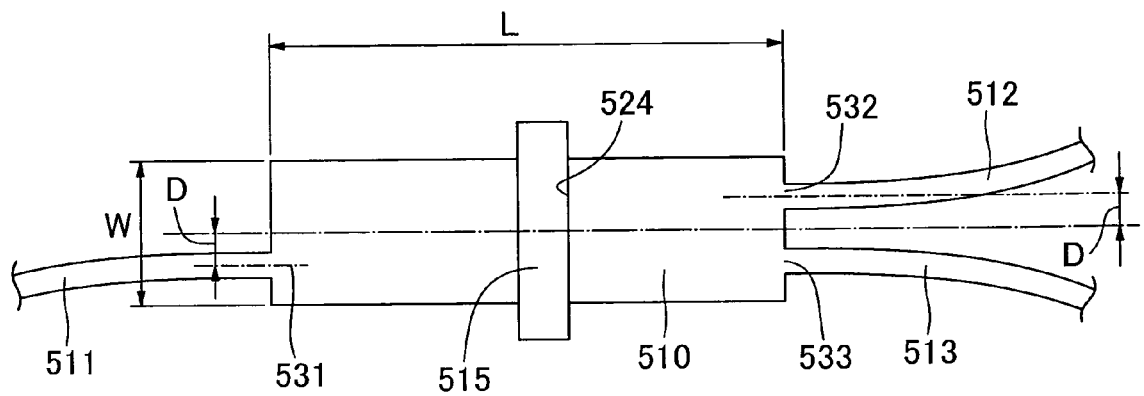
FIG. 21 is a schematic view for explaining an optical principle of the optical coupling/splitting device disclosed in the Patent Publication 3.
Figure 22:
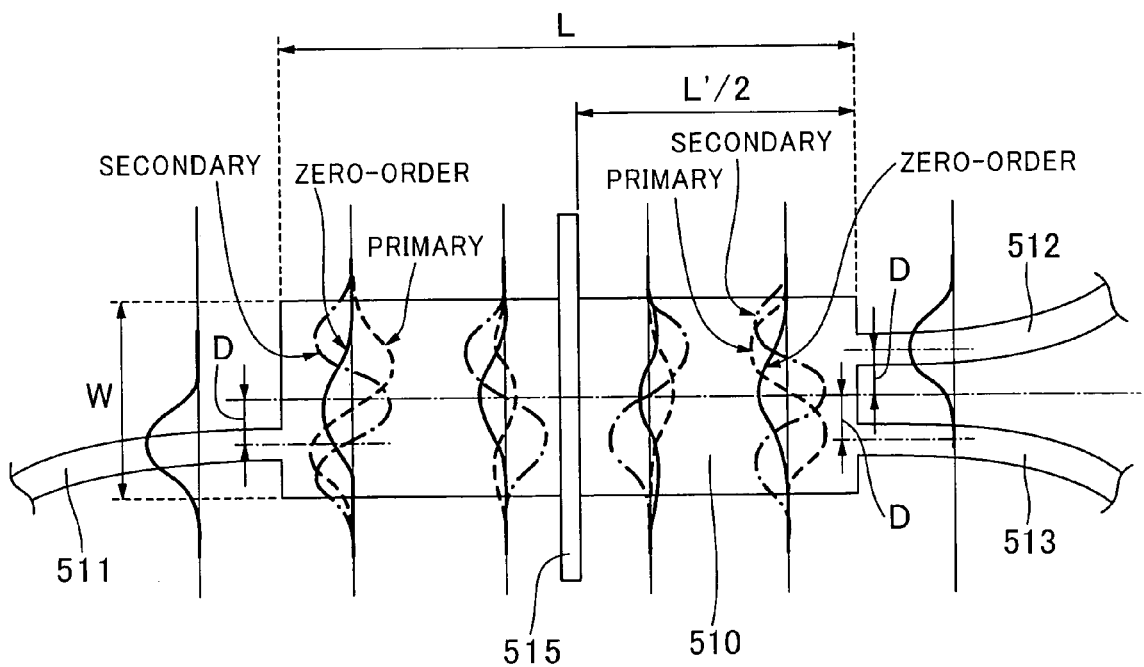
FIG. 22 is a schematic view for explaining an operation of the optical coupling/splitting device disclosed in the Patent Publication 3.

Next, referring to FIG. 16, a coarse wavelength division multiplexing (CWDM) receiver which is a second example of application of the optical system according to the present invention will be explained. FIG. 16 is a schematic top plan view of the CWDM reviver using the optical system according to the present invention.

The CWDM reviver 620 includes six optical systems 622a to 622f. Since each of the optical filters 24 of the fourth to sixth optical systems 622d to 622f is a mirror, the first optical input/output means of each of the optical systems 622d to 622f is omitted. The third optical input/output means 16 of the first to third optical systems 622a to 622c are respectively connected to the second optical input/output means 14 of the fourth to sixth optical systems 622d to 622f, while the third optical input/output means 16 of the fourth and fifth optical systems 622d and 622e are respectively connected to the second optical input/output means 14 of the second and third optical systems 622b and 622c. The optical filter 24 of the first optical system 622a allows light having a first wavelength to be transmitted therethrough and reflects light having a second, third or fourth wavelength. The optical filter 24 of the second optical system 622b allows light having the second wavelength to be transmitted therethrough and reflects light having the third or fourth wavelength. The optical filter 24 of the third optical system 622c allows light having the third wavelength to be transmitted therethrough and reflects light having the fourth wavelength.

In this CWDM reviver 620, when light having the first to fourth wavelengths is input through the second optical input/output means 14 of the optical system 622a, respective lights having the first, second and third wavelength are respectively output through the first optical input/output means 12 of the first, second and third optical systems 622a, 622b, 622c while light having the fourth wavelength is output through the third optical input/output means 16 of the sixth optical system 622f.

Similar to the application to the CWDM receiver, the optical system according to the present invention can be applied to a dense wavelength division multiplexing (DWDM) receiver, Next, referring to FIG. 17, a cross-type optical coupling/splitting device which is a third application of the optical system according to the present invention will be explained. FIG. 17 is a schematic top plan view of the cross-type optical coupling/splitting device using the optical system according to the present invention.

A cross-type optical coupling/splitting device 640 has the same structure as that of the optical system 10 according to the present invention except for a fourth optical input/output means 642 added to the fourth multi-mode optical waveguide 20 of the optical system 10.

In this cross-type optical coupling/splitting device 640, for example, light may be transmitted between the fourth optical input/output means 642 and the third optical input/output means 16 or between the fourth optical input/output means 642 and the first optical input/output means 12.

Next, referring to FIG. 18, a cross switch which is a fourth application of the optical system according to the present invention will be explained. FIG. 18 is a schematic top plan view of a cross switch using the optical system according to the present invention.

This cross switch 660 has the same structure as that of the above cross-type optical coupling/splitting device 640 except that the optical filter 24 thereof is replaced with a mirror 622 and the mirror 622 is designed to be moved between a reflecting position 662a located between the fourth and the fifth multi-mode optical waveguide, and a transmitting position 662b apart from the reflecting position 662a.

In the above cross switch 660, for example, when the mirror 662 is located at the reflecting position 662a, light is transmitted between the first and fourth optical input/output means 12, 642 and between the second and third optical input/output means 14, 16. When the mirror 662 is located at the transmitting position 662b, light is transmitted between the first and second optical input/output means 12, 14 and between the third and fourth optical input/output means 16, 642.

What is claimed is:

1. An optical system with waveguides comprising:
   a first optical input/output means,
   a second optical input/output means,
   a third optical input/output means,
   a fourth multi-mode optical waveguide capable of propagating light with plural propagation modes,
   a fifth multi-mode optical waveguide capable of propagating light with plural propagation modes, and
   optical-filter mounting means for mounting an optical filter between the fourth and fifth multi-mode optical waveguides across a traveling direction of light in the fourth and fifth multi-mode optical waveguides;
   wherein the first optical input/output means is connected to an end face of the fourth multi-mode optical waveguide on a side thereof opposite to the optical-filter mounting means;
   wherein each of the second and third optical input/output means is connected to an end face of the fifth multi-mode optical waveguide on a side opposite to the optical-filter mounting means;
   wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical filter;
   wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide.

2. The optical system with waveguides according to claim 1,
   wherein respective widths in a direction orthogonal to the light-traveling direction of the fourth and fifth multi-mode optical waveguides are different from each other.

3. The optical system with waveguides according to claim 2, wherein the width of the fourth multi-mode optical waveguide is greater than that of the fifth multi-mode optical waveguide.

4. The optical system with waveguides according to claim 2, wherein a width in a direction orthogonal to the light-traveling direction of one of the fourth and fifth multi-mode optical waveguides is smaller than a width in a direction orthogonal to the light-traveling direction of the other thereof, and one of the first, second and third optical input/output means through which light is transmitted most efficiently is connected to said one of the fourth and fifth multi-mode optical waveguides.

5. The optical system with waveguides according to claim 2, wherein each of widths in a direction orthogonal to the light-traveling direction of the fourth and fifth multi-mode optical waveguides is in the range of 5-20 µm.

6. The optical system with waveguides according to claim 1,
wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide.

7. The optical system with waveguides according to claim 1,
wherein a width in a direction orthogonal to the light-traveling direction of the first optical input/output means is different from a width in a direction orthogonal to the light-traveling direction of at least one of the second and third optical input/output means.

8. The optical system with waveguides according to claim 7,
wherein the width in the direction orthogonal to the light-traveling direction of the first optical input/output means is smaller than the width in the direction orthogonal to the light-traveling direction of at least one of the second and third optical input/output means.

9. The optical system with waveguides according to claim 1,
wherein a width in a direction orthogonal to the light-traveling direction of the third optical input/output means is different from a width in a direction orthogonal to the light-traveling direction of the second optical input/output means.

10. The optical system with waveguides according to any one of claims 2-5 and 7-9,
wherein half of a distance between respective centers of input/output ends of the second and third optical input/output means connected to the fifth multi-mode optical waveguide is different from a distance between (a) a center line between the respective centers of the input/output ends of the second and third optical input/output means, and (b) a center of an input/output end of the first optical input/output means connected to the fourth multi-mode optical waveguide.

11. The optical system with waveguides according to claim 6,
wherein half of the distance between respective centers of input/output ends of the second and third optical input/output means connected to the fifth multi-mode optical waveguide is greater than the other distance between the center line between the respective centers of the input/output ends of the second and third optical input/output means, and the center of an input/output end of the first optical input/output means connected to the fourth multi-mode optical waveguide.

12. The optical system with waveguides according to claim 1,
wherein a center line of the fourth multi-mode optical waveguide extending in the light-traveling direction is offset relative to a center line of the fifth multi-mode optical waveguide extending in the light-traveling direction.

13. The optical system with waveguides according to claim 1,
wherein a center line of the fourth multi-mode optical waveguide extending in the light-traveling direction is offset relative to a center line between the respective centers of the input/output ends of the second and third optical input/output means connected to the fifth multi-mode optical waveguide.

14. The optical system with waveguides according to claim 2,
wherein the optical filter is adapted to allow a first transmitting light and a second transmitting light to be transmitted therethrough and to allow a third reflecting light to be reflected thereat;
wherein the first transmitting light input from the first optical input/output means is transmitted to the second optical input/output means and is restricted to be transmitted to the first and third optical input/output means;
wherein the third reflecting light input from the second optical input/output means is transmitted to the third optical input/output means and is restricted to be transmitted to the first and second optical input/output means; and
wherein the second transmitting light input from the second optical input/output means is transmitted to the first optical input/output means and is restricted to be transmitted to the second and third optical input/output means.

15. The optical system with waveguides according to claim 2,
wherein the optical filter is adapted to allow a first transmitting light and a second transmitting light to be transmitted therethrough and to allow a third reflecting light to be reflected thereat;
wherein the second transmitting light input from the first optical input/output means is transmitted to the second optical input/output means and is restricted to be transmitted to the first and third optical input/output means;
wherein the first transmitting light input from the second optical input/output means is transmitted to the first optical input/output means and is restricted to be transmitted to the second and third optical input/output means; and
wherein the third reflecting light input from the third optical input/output means is transmitted to the second optical input/output means and is restricted to be transmitted to the first and third optical input/output means.

16. The optical system with waveguides according to claim 2,
wherein the optical filter is adapted to allow a first reflecting light and a second reflecting light to be reflected thereat and to allow a third transmitting light to be transmitted therethrough;
wherein the second reflecting light input from the second optical input/output means is transmitted to the third optical input/output means and is restricted to be transmitted to the first and second optical input/output means;
wherein the third transmitting light input from the second optical input/output means is transmitted to the first optical input/output means and is restricted to be transmitted to the second and third optical input/output means; and
wherein the first reflecting light input from the third optical input/output means is transmitted to the second optical input/output means and is restricted to be transmitted to the first and third optical input/output means.

17. The optical system with waveguides according to claim 2,
wherein each of the second and third optical input/output means is connected to an end face of the fifth multi-mode optical waveguide on a side opposite to the optical-filter mounting means;
wherein the optical filter is adapted to allow a first reflecting light and a second reflecting light to be reflected thereat and to allow a third transmitting light to be transmitted therethrough;
wherein the third transmitting light input from the first optical input/output means is transmitted to the second optical input/output means and is restricted to be transmitted to the first and third optical input/output means;
wherein the first reflecting light input from the second optical input/output means is transmitted to the third optical input/output means and is restricted to be transmitted to the first and second optical input/output means; and
wherein the second reflecting light input from the third optical input/output means is transmitted to the second optical input/output means and is restricted to be transmitted to the first and third optical input/output means.

18. The optical system with waveguides according to any one of claims 2, 6, 7, 9, 12 and 13,
wherein $L_4$ is a length in the light-traveling direction of the fourth multi-mode optical waveguide, $L_5$ is a length in the light-traveling direction of the fifth multi-mode optical waveguide,
100 μm$\leq L_4+L_5 \leq$800 μm, and
50 μm$\leq L_5 \leq$400 μm.

19. The optical system with waveguides according to any one of claims 2, 6, 7, 9, 12 and 13, wherein each of the first, second and third optical input/output means is a single-mode optical waveguide.

20. The optical system with waveguides according to any one of claims 2, 6, 7, 9, 12 and 13, wherein the first optical input/output means is an optical fiber and each of the second and third optical input/output means is a single-mode optical waveguide.

21. An optical coupling/splitting device comprising:
an optical system with waveguides according to any one of claims 2, 6, 7, 9, 12 and 13; and
an optical filter mounted to the optical-filter mounting means of the optical system.

22. The optical system with waveguides according to claim 10,
wherein half of the distance between respective centers of input/output ends of the second and third optical input/output means connected to the fifth multi-mode optical waveguide is greater than the other distance between (a) the center line between the respective centers of the input/output ends of the second and third optical input/output means, and (b) the center of an input/output end of the first optical input/output means connected to the fourth multi-mode optical waveguide.

23. The optical system with waveguides according to claim 6,
wherein the optical filter is adapted to allow a first transmitting light and a second transmitting light to be transmitted therethrough and to allow a third reflecting light to be reflected thereat;
wherein the first transmitting light input from the first optical input/output means is transmitted to the second optical input/output means and is restricted to be transmitted to the first and third optical input/output means;
wherein the third reflecting light input from the second optical input/output means is transmitted to the third optical input/output means and is restricted to be transmitted to the first and second optical input/output means; and
wherein the second transmitting light input from the second optical input/output means is transmitted to the first optical input/output means and is restricted to be transmitted to the second and third optical input/output means.

24. The optical system with waveguides according to claim 6,
wherein the optical filter is adapted to allow a first transmitting light and a second transmitting light to be transmitted therethrough and to allow a third reflecting light to be reflected thereat;
wherein the second transmitting light input from the first optical input/output means is transmitted to the second optical input/output means and is restricted to be transmitted to the first and third optical input/output means;
wherein the first transmitting light input from the second optical input/output means is transmitted to the first optical input/output means and is restricted to be transmitted to the second and third optical input/output means; and
wherein the third reflecting light input from the third optical input/output means is transmitted to the second optical input/output means and is restricted to be transmitted to the first and third optical input/output means.

25. An optical system with waveguides comprising a first optical system according to claim 23 and a second optical system with waveguides, wherein the second optical system with waveguides comprises:
a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;
wherein the first optical input/output means is connected to an end face of the fourth multi-mode optical waveguide on a side thereof opposite to the optical-filter mounting means;
wherein each of the second and third optical input/output means is connected to an end face of the fifth multi-mode optical waveguide on a side opposite to the optical-filter mounting means;
wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide;

wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

26. The optical system with waveguides according to claim 6,
wherein the optical filter is adapted to allow a first reflecting light and a second reflecting light to be reflected thereat and to allow a third transmitting light to be transmitted therethrough;
wherein the second reflecting light input from the second optical input/output means is transmitted to the third optical input/output means and is restricted to be transmitted to the first and second optical input/output means;
wherein the third transmitting light input from the second optical input/output means is transmitted to the first optical input/output means and is restricted to be transmitted to the second and third optical input/output means; and
wherein the first reflecting light input from the third optical input/output means is transmitted to the second optical input/output means and is restricted to be transmitted to the first and third optical input/output means.

27. The optical system with waveguides according to claim 6,
wherein each of the second and third optical input/output means is connected to an end face of the fifth multi-mode optical waveguide on a side opposite to the optical-filter mounting means;
wherein the optical filter is adapted to allow a first reflecting light and a second reflecting light to be reflected thereat and to allow a third transmitting light to be transmitted therethrough;
wherein the third transmitting light input from the first optical input/output means is transmitted to the second optical input/output means and is restricted to be transmitted to the first and third optical input/output means;
wherein the first reflecting light input from the second optical input/output means is transmitted to the third optical input/output means and is restricted to be transmitted to the first and second optical input/output means; and
wherein the second reflecting light input from the third optical input/output means is transmitted to the second optical input/output means and is restricted to be transmitted to the first and third optical input/output means.

28. An optical system with waveguides comprising a a first optical system according to claim 26 and a second optical system with waveguides, wherein the second optical system with waveguides comprises:
a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;
wherein the first optical input/output means is connected to an end face of the fourth multi-mode optical waveguide on a side thereof opposite to the optical-filter mounting means;
wherein each of the second and third optical input/output means is connected to an end face of the fifth multi-mode optical waveguide on a side opposite to the optical-filter mounting means;
wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

29. An optical system with waveguides comprising a first optical system according to claim 23 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

30. An optical system with waveguides comprising a first optical system according to claim 24 and a second optical system with waveguides, wherein the second optical system with waveguides comprises:

a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide;

wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output; and wherein the respective second optical input/output means of the first and second optical systems are optically connected to each other through an optical fiber.

31. The optical system with waveguides according to claim 7, wherein the optical filter is adapted to allow a first transmitting light and a second transmitting light to be transmitted therethrough and to allow a third reflecting light to be reflected thereat;

wherein the first transmitting light input from the first optical input/output means is transmitted to the second optical input/output means and is restricted to be transmitted to the first and third optical input/output means;

wherein the third reflecting light input from the second optical input/output means is transmitted to the third optical input/output means and is restricted to be transmitted to the first and second optical input/output means; and wherein the second transmitting light input from the second optical input/output means is transmitted to the first optical input/output means and is restricted to be transmitted to the second and third optical input/output means.

32. The optical system with waveguides according to claim 7,
wherein the optical filter is adapted to allow a first transmitting light and a second transmitting light to be transmitted therethrough and to allow a third reflecting light to be reflected thereat;
wherein the second transmitting light input from the first optical input/output means is transmitted to the second optical input/output means and is restricted to be transmitted to the first and third optical input/output means;
wherein the first transmitting light input from the second optical input/output means is transmitted to the first optical input/output means and is restricted to be transmitted to the second and third optical input/output means; and
wherein the third reflecting light input from the third optical input/output means is transmitted to the second optical input/output means and is restricted to be transmitted to the first and third optical input/output means.

33. An optical system with waveguides comprising a first optical system according to claim 31 and a second optical system with waveguides, wherein the second optical system comprises:
a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;
wherein the first optical input/output means is connected to an end face of the fourth multi-mode optical waveguide on a side thereof opposite to the optical-filter mounting means;
wherein each of the second and third optical input/output means is connected to an end face of the fifth multi-mode optical waveguide on a side opposite to the optical-filter mounting means;
wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;
wherein a width in a direction orthogonal to the light-traveling direction of the first optical input/output means is different from a width in a direction orthogonal to the light-traveling direction of at least one of the second and third optical input/output means;
wherein the optical filter is adapted to allow a first transmitting light and a second transmitting light to be transmitted therethrough and to allow a third reflecting light to be reflected thereat;
wherein the second transmitting light input from the first optical input/output means is transmitted to the second optical input/output means and is restricted to be transmitted to the first and third optical input/output means;
wherein the first transmitting light input from the second optical input/output means is transmitted to the first optical input/output means and is restricted to be transmitted to the second and third optical input/output means; and
wherein the third reflecting light input from the third optical input/output means is transmitted to the second optical input/output means and is restricted to be transmitted to the first and third optical input/output means; and
wherein the respective second optical input/output means of the first and second optical systems are optically connected to each other through an optical fiber.

34. The optical system with waveguides according to claim 7,
wherein the optical filter is adapted to allow a first reflecting light and a second reflecting light to be reflected thereat and to allow a third transmitting light to be transmitted therethrough;
wherein the second reflecting light input from the second optical input/output means is transmitted to the third optical input/output means and is restricted to be transmitted to the first and second optical input/output means;
wherein the third transmitting light input from the second optical input/output means is transmitted to the first optical input/output means and is restricted to be transmitted to the second and third optical input/output means; and
wherein the first reflecting light input from the third optical input/output means is transmitted to the second optical input/output means and is restricted to be transmitted to the first and third optical input/output means.

35. The optical system with waveguides according to claim 7,
wherein each of the second and third optical input/output means is connected to an end face of the fifth multi-mode optical waveguide on a side opposite to the optical-filter mounting means;
wherein the optical filter is adapted to allow a first reflecting light and a second reflecting light to be reflected thereat and to allow a third transmitting light to be transmitted therethrough;
wherein the third transmitting light input from the first optical input/output means is transmitted to the second optical input/output means and is restricted to be transmitted to the first and third optical input/output means;
wherein the first reflecting light input from the second optical input/output means is transmitted to the third optical input/output means and is restricted to be transmitted to the first and second optical input/output means; and
wherein the second reflecting light input from the third optical input/output means is transmitted to the second optical input/output means and is restricted to be transmitted to the first and third optical input/output means.

36. An optical system with waveguides comprising a first optical system according to claim 34 and a second optical system with waveguides, wherein the second optical system with waveguides comprises:
a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;
wherein the first optical input/output means is connected to an end face of the fourth multi-mode optical waveguide on a side thereof opposite to the optical-filter mounting means;
wherein each of the second and third optical input/output means is connected to an end face of the fifth multi-mode optical waveguide on a side opposite to the optical-filter mounting means;
wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;
wherein a width in a direction orthogonal to the light-traveling direction of the first optical input/output means is different from a width in a direction orthogonal to the light-traveling direction of at least one of the second and third optical input/output means;
wherein each of the second and third optical input/output means is connected to an end face of the fifth multi-mode optical waveguide on a side opposite to the optical-filter mounting means;
wherein the optical filter is adapted to allow a first reflecting light and a second reflecting light to be reflected thereat and to allow a third transmitting light to be transmitted therethrough;
wherein the third transmitting light input from the first optical input/output means is transmitted to the second optical input/output means and is restricted to be transmitted to the first and third optical input/output means;
wherein the first reflecting light input from the second optical input/output means is transmitted to the third optical input/output means and is restricted to be transmitted to the first and second optical input/output means; and
wherein the second reflecting light input from the third optical input/output means is transmitted to the second optical input/output means and is restricted to be transmitted to the first and third optical input/output means; and
wherein the respective second optical input/output means of the first and second optical systems are optically connected to each other through an optical fiber.

37. An optical system with waveguides comprising a first optical system according to claim 31 and a second optical system with waveguides, wherein the second optical system with waveguides comprises:
a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a width in a direction orthogonal to the light-traveling direction of the first optical input/output means is different from a width in a direction orthogonal to the light-traveling direction of at least one of the second and third optical input/output means;

wherein each of the second and third optical input/Output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

38. An optical system with waveguides comprising a first optical system according to claim 32 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multimode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a width in a direction orthogonal to the light-traveling direction of the first optical input/output means is different from a width in a direction orthogonal to the light-traveling direction of at least one of the second and third optical input/output means;

wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

39. The optical system with waveguides according to claim 9, wherein the optical filter is adapted to allow a first transmitting light and a second transmitting light to be transmitted therethrough and to allow a third reflecting light to be reflected thereat;

wherein the first transmitting light input from the first optical input/output means is transmitted to the second optical input/output means and is restricted to be transmitted to the first and third optical input/output means;

wherein the third reflecting light input from the second optical input/output means is transmitted to the third optical input/output means and is restricted to be transmitted to the first and second optical input/output means; and wherein the second transmitting light input from the second optical input/output means is transmitted to the first optical input/output means and is restricted to be transmitted to the second and third optical input/output means.

40. The optical system with waveguides according to claim 9, wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means.

41. An optical system with waveguides comprising a first optical system according to claim 39 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguides on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/output means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a width in a direction orthogonal to the light-traveling direction of the third optical input/output means is different from a width in a direction orthogonal to the light-traveling direction of the second optical input/output means;

wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

42. The optical system with waveguides according to claim 9, wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means.

43. The optical system with waveguides according to claim 9, wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means.

44. An optical system with waveguides comprising a first optical system according to claim 42 and a second optical system with waveguides, wherein the second optical system with waveguides comprises:

a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a width in a direction orthogonal to the light-traveling direction of the third optical input/output means is different from a width in a direction orthogonal to the light-traveling direction of the second optical input/output means;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

45. An optical system with waveguides comprising a first optical system according to claim 39 and a second optical system with waveguides wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a width in a direction orthogonal to the light-traveling direction of the third optical input/output means is different from a width in a direction orthogonal to the light-traveling direction of the second optical input/output means;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

46. An optical system with waveguides comprising a first optical system according to claim 40 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein a width in a direction orthogonal to the light-traveling direction of the third optical input/output means is different from a width in a direction orthogonal to the light-traveling direction of the second optical input/output means;

wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

47. The optical system with waveguides according to claim 12, wherein the optical filter is adapted to allow a first transmitting light and a second transmitting light to be transmitted therethrough and to allow a third reflecting light to be reflected thereat;

wherein the first transmitting light input from the first optical input/output means is transmitted to the second optical input/output means and is restricted to be transmitted to the first and third optical input/output means;

wherein the third reflecting light input from the second optical input/output means is transmitted to the third optical input/output means and is restricted to be transmitted to the first and second optical input/output means; and wherein the second transmitting light input from the second optical input/output means is transmitted to the first optical input/output means and is restricted to be transmitted to the second and third optical input/output means.

48. The optical system with waveguides according to claim 12, wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means.

49. An optical system with waveguides comprising a first optical system according to claim 47 and a second optical system with waveguides, wherein the second optical system with waveguides comprises:

a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line of the fifth multi-mode optical waveguide extending in the light-traveling direction;

wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

50. The optical system with waveguides according to claim 12, wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means.

51. The optical system with waveguides according to claim 12, wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means.

52. An optical system with waveguides comprising a first optical system according to claim 50 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line of the fifth multi-mode optical waveguide extending in the light-traveling direction;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

53. An optical system with waveguides comprising a first optical system according to claim 47 and a second optical system with waveguides, wherein the second optical system with waveguides comprises:

a first optical input/output means,
a second optical input/output means,
a third optical input/output means,
a fourth multi-mode optical waveguide capable of propagating light with plural propagation modes,
a fifth multi-mode optical waveguide capable of propagating light with plural propagation modes, and
optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line of the fifth multi-mode optical waveguide extending in the light-traveling direction;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

54. An optical system with waveguides comprising a a first optical system according to claim 48 and a second optical system with waveguides, wherein the second optical system with waveguides comprises:

a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line of the fifth multi-mode optical waveguide extending in the light-traveling direction;

wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means;

wherein the respective second optical input/output means of the first and second optical systems are optically connected to each other through an optical fiber.

55. The optical system with waveguides according to claim 13, wherein the optical filter is adapted to allow a first transmitting light and a second transmitting light to be transmitted therethrough and to allow a third reflecting light to be reflected thereat;

wherein the first transmitting light input from the first optical input/output means is transmitted to the second optical input/output means and is restricted to be transmitted to the first and third optical input/output means;

wherein the third reflecting light input from the second optical input/output means is transmitted to the third optical input/output means and is restricted to be transmitted to the first and second optical input/output means; and wherein the second transmitting light input from the second optical input/output means is transmitted to the first optical input/output means and is restricted to be transmitted to the second and third optical input/output means.

56. The optical system with waveguides according to claim 13, wherein the optical filter is adapted to allow a first transmitting light and a second transmitting light to be transmitted therethrough and to allow a third reflecting light to be reflected thereat;

wherein the second transmitting light input from the first optical input/output means is transmitted to the second optical input/output means and is restricted to be transmitted to the first and third optical input/output means;

wherein the first transmitting light input from the second optical input/output means is transmitted to the first optical input/output means and is restricted to be transmitted to the second and third optical input/output means; and wherein the third reflecting light input from the third optical input/output means is transmitted to the second optical input/output means and is restricted to be transmitted to the first and third optical input/output means.

57. An optical system with waveguides comprising a first optical system according to claim 55 and a second optical system with waveguides, wherein the second optical system with waveguides comprises:
- a first optical input/output means,
- a second optical input/output means,
- a third optical input/output means,
- a fourth multi-mode optical waveguide capable of propagating light with plural propagation modes,
- a fifth multi-mode optical waveguide capable of propagating light with plural propagation modes, and
- optical-filter mounting means for mounting an optical filter between the fourth and fifth multi-mode optical waveguides across a traveling direction of light in the fourth and fifth multi-mode optical waveguides;
- wherein the first optical input/output means is connected to an end face of the fourth multi-mode optical waveguide on a side thereof opposite to the optical-filter mounting means;
- wherein each of the second and third optical input/output means is connected to an end face of the fifth multi-mode optical waveguide on a side opposite to the optical-filter mounting means;
- wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
- wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;
- wherein a center line of the fourth multi-mode optical waveguide extending in the light-traveling direction is offset relative to a center line between the respective centers of the input/output ends of the second and third optical input/output means connected to the fifth multi-mode optical waveguide;
- wherein the optical filter is adapted to allow a first transmitting light and a second transmitting light to be transmitted therethrough and to allow a third reflecting light to be reflected thereat;
- wherein the second transmitting light input from the first optical input/output means is transmitted to the second optical input/output means and is restricted to be transmitted to the first and third optical input/output means;
- wherein the first transmitting light input from the second optical input/output means is transmitted to the first optical input/output means and is restricted to be transmitted to the second and third optical input/output means; and
- wherein the third reflecting light input from the third optical input/output means is transmitted to the second optical input/output means and is restricted to be transmitted to the first and third optical input/output means; and
- wherein the respective second optical input/output means of the first and second optical systems are optically connected to each other through an optical fiber.

58. The optical system with waveguides according to claim 13,
- wherein the optical filter is adapted to allow a first reflecting light and a second reflecting light to be reflected thereat and to allow a third transmitting light to be transmitted therethrough;
- wherein the second reflecting light input from the second optical input/output means is transmitted to the third optical input/output means and is restricted to be transmitted to the first and second optical input/output means;
- wherein the third transmitting light input from the second optical input/output means is transmitted to the first optical input/output means and is restricted to be transmitted to the second and third optical input/output means; and
- wherein the first reflecting light input from the third optical input/output means is transmitted to the second optical input/output means and is restricted to be transmitted to the first and third optical input/output means.

59. The optical system with waveguides according to claim 13,
- wherein each of the second and third optical input/output means is connected to an end face of the fifth multi-mode optical waveguide on a side opposite to the optical-filter mounting means;
- wherein the optical filter is adapted to allow a first reflecting light and a second reflecting light to be reflected thereat and to allow a third transmitting light to be transmitted therethrough;
- wherein the third transmitting light input from the first optical input/output means is transmitted to the second optical input/output means and is restricted to be transmitted to the first and third optical input/output means;
- wherein the first reflecting light input from the second optical input/output means is transmitted to the third optical input/output means and is restricted to be transmitted to the first and second optical input/output means; and
- wherein the second reflecting light input from the third optical input/output means is transmitted to the second optical input/output means and is restricted to be transmitted to the first and third optical input/output means.

60. An optical system with waveguides comprising a first optical system according to claim 58 and a second optical system with waveguides, wherein the second optical system with waveguides comprises:
- a first optical input/output means,
- a second optical input/output means,
- a third optical input/output means,
- a fourth multi-mode optical waveguide capable of propagating light with plural propagation modes,
- a fifth multi-mode optical waveguide capable of propagating light with plural propagation modes, and
- optical-filter mounting means for mounting an optical filter between the fourth and fifth multi-mode optical waveguides across a traveling direction of light in the fourth and fifth multi-mode optical waveguides;
- wherein the first optical input/output means is connected to an end face of the fourth multi-mode optical waveguide on a side thereof opposite to the optical-filter mounting means;
- wherein each of the second and third optical input/output means is connected to an end face of the fifth multi-mode optical waveguide on a side opposite to the optical-filter mounting means;
- wherein, when an optical filter is mounted to the optical-filter mounting means,
- perturbation of fields of three or more light waves having respective wavelengths and input through any one of the first, second and third optical input/output means is caused by transmitting the light wave through the optical filter or reflecting the light wave at the optical fiber;
- wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;
- wherein a center line of the fourth multi-mode optical waveguide extending in the light-traveling direction is offset relative to a center line between the respective centers of the input/output ends of the second and third optical input/output means connected to the fifth multi-mode optical waveguide;
- wherein each of the second and third optical input/output means is connected to an end face of the fifth multi-mode optical waveguide on a side opposite to the optical-filter mounting means;
- wherein the optical filter is adapted to allow a first reflecting light and a second reflecting light to be reflected thereat and to allow a third transmitting light to be transmitted therethrough;
- wherein the third transmitting light input from the first optical input/output means is transmitted to the second optical input/output means and is restricted to be transmitted to the first and third optical input/output means;
- wherein the first reflecting light input from the second optical input/output means is transmitted to the third optical input/output means and is restricted to be transmitted to the first and second optical input/output means; and
- wherein the second reflecting light input from the third optical input/output means is transmitted to the second optical input/output means and is restricted to be transmitted to the first and third optical input/output means; and
- wherein the respective second optical input/output means of the first and second optical systems are optically connected to each other through an optical fiber.

61. An optical system with waveguides comprising a first optical system according to claim 55 and a second optical system with waveguides, wherein the second optical system with waveguides comprises:
- a first optical input/output means,
- a second optical input/output means,
- a third optical input/output means,
- a fourth multi-mode optical waveguide capable of propagating light with plural propagation modes,
- a fifth multi-mode optical waveguide capable of propagating light with plural propagation modes, and
- optical-filter mounting means for mounting an optical filter between the fourth and fifth multi-mode optical waveguides across a traveling direction of light in the fourth and fifth multi-mode optical waveguides;
- wherein the first optical input/output means is connected to an end face of the fourth multi-mode optical waveguide on a side thereof opposite to the optical-filter mounting means;
- wherein each of the second and third optical input/output means is connected to an end face of the fifth multi-mode optical waveguide on a side opposite to the optical-filter mounting means;
- wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;
- wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line between the respective centers of the input/output ends of the second and third optical input/output means connected to the fifth multi-mode optical waveguide;

wherein each of the second and third optical input/output means is connected to an end face of the fifth multi-mode optical waveguide on a side opposite to the optical-filter mounting means;

wherein the optical filter is adapted to allow a first reflecting light and a second reflecting light to be reflected thereat and to allow a third transmitting light to be transmitted therethrough;

wherein the third transmitting light input from the first optical input/output means is transmitted to the second optical input/output means and is restricted to be transmitted to the first and third optical input/output means;

wherein the first reflecting light input from the second optical input/output means is transmitted to the third optical input/output means and is restricted to be transmitted to the first and second optical input/output means; and wherein the second reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

62. An optical system with waveguides comprising a first optical system according to claim 56 and a second optical system with waveguides, wherein the second optical system with waveguides comprises:

a first optical input/output means, a second optical input/output means, a third optical input/output means, a fourth multi-mode optical waveguide capable of propagating light with plural propagation modes, a fifth multi-mode optical waveguide capable of propagating light with plural propagation modes, and optical-filter mounting means for mounting an optical filter between the fourth and fifth multi-mode optical waveguides across a traveling direction of light in the fourth and fifth multi-mode optical waveguides;

wherein the first optical input/output means is connected to an end face of the fourth multi-mode optical waveguide on a side thereof opposite to the optical-filter mounting means;

wherein each of the second and third optical input/output means is connected to an end face of the fifth multi-mode optical waveguide on a side opposite to the optical-filter mounting means;

wherein, when an optical filter is mounted to the optical-filter mounting means, perturbation of fields of three or more light waves having respective wavelengths and input through any one of the first, second and third optical input/output means is caused by transmitting the light wave through the optical filter or reflecting the light wave at the optical fiber;

wherein, in order to reduce insertion loss and enhance isolation of the three or more light waves, depending on the perturbation, (i) respective widths in a direction orthogonal to the light-traveling direction of the fourth and fifth multi-mode optical waveguides are different from each other, (ii) half of a distance between respective centers of input/output ends of the second and third optical input/output means connected to the fifth multi-mode optical waveguide is different from another distance between a center line between the respective centers of the input/output ends of the second and third optical input/output means, and a center of an input/output end of the first optical input/output means connected to the fourth multi-mode optical waveguide, (iii) a width in a direction orthogonal to the light-traveling direction of the first optical input/output means is different from another/other width(s) in a direction orthogonal to the light-traveling direction of at least one of the second and third optical input/output means, (iv) a width in a direction orthogonal to the light-traveling direction of the third optical input/out means is different from another width in a direction orthogonal to the light-traveling direction of the second optical input/output means, (v) a center line of the fourth multi-mode optical waveguide extending in the light-traveling direction is offset relative to another center line of the fifth multi-mode optical waveguide extending in the light-traveling direction, or (vi) a center line of the fourth multi-mode optical waveguide extending in the light-traveling direction is offset relative to another center line between the respective centers of the input/output ends of the second and third optical input/output means connected to the fifth multi-mode optical waveguide;

wherein a center line of the fourth multi-mode optical waveguide extending in the light-traveling direction is offset relative to a center line between the respective centers of the input/output ends of the second and third optical input/output means connected to the fifth multi-mode optical waveguide;

wherein the optical filter is adapted to allow a first reflecting light and a second reflecting light to be reflected thereat and to allow a third transmitting light to be transmitted therethrough;

wherein the second reflecting light input from the second optical input/output means is transmitted to the third optical input/output means and is restricted to be transmitted to the first and second optical input/output means;

wherein the third transmitting light input from the second optical input/output means is transmitted to the first optical input/output means and is restricted to be transmitted to the second and third optical input/output means; and wherein the first reflecting light input from the third optical input/output means is transmitted to the second optical input/output means and is restricted to be transmitted to the first and third optical input/output means; and wherein the respective second optical input/output means of the first and second optical systems are optically connected to each other through an optical fiber.

63. An optical system with waveguides comprising first and second optical systems according to claim 1;

wherein respective widths in a direction orthogonal to the light-traveling direction of the fourth and fifth multi-mode optical waveguides of the first optical system are different from each other;

wherein the respective second optical input/output means of the first and second optical systems are optically connected to each other through such as an optical fiber;

wherein the optical filters of the first and second optical systems are adapted to allow a first transmitting light and a second transmitting light to be transmitted therethrough and to allow a third reflecting light to be reflected thereat;

wherein the first transmitting light input from the first optical input/output means of the first optical system is transmitted through the second optical input/output means of the first and second optical systems to the first optical input/output means of the second optical system and is restricted to be transmitted to the first and third optical input/output means of the first optical system and the second and third optical input/output means of the second optical system;

wherein the second transmitting light input from the first optical input/output means of the second optical system is transmitted through the second optical input/output means of the first and second optical systems to the first optical input/output means of the first optical system and is restricted to be transmitted to the first and third optical input/output means of the second optical system and the second and third optical input/output means of the first optical system; and wherein the third reflecting light input from the third optical input/output means of the second optical system is transmitted through the second optical input/output means of the first and second optical systems to the third optical input/output means of the first optical system and is restricted to be transmitted to the first and third optical input/output means of the second optical system and the first and second optical input/output means of the first optical system.

64. An optical system with waveguides comprising first and second optical systems according to claim 1;

wherein respective widths in a direction orthogonal to the light-traveling direction of the fourth and fifth multi-mode optical waveguides of the first optical system are different from each other;

wherein the respective second optical input/output means of the first and second optical systems are optically connected to each other through such as an optical fiber;

wherein the optical filters of the first and second optical systems are adapted to allow a first reflecting light and a second reflecting light to be reflected thereat and to allow a third transmitting light to be transmitted therethrough;

wherein the first reflecting light input from the third optical input/output means of the first optical system is transmitted through the second optical input/output means of the first and second optical systems to the third optical input/output means of the second optical system and is restricted to be transmitted to the first and third optical input/output means of the first optical system and the first and second optical input/output means of the second optical system;

wherein the second reflecting light input from the third optical input/output means of the second optical system is transmitted through the second optical input/output means of the first and second optical systems to the third optical input/output means of the first optical system and is restricted to be transmitted to the first and third optical input/output means of the second optical system and the first and second optical input/output means of the first optical system; and wherein the third transmitting light input from the first optical input/output means of the second optical system is transmitted through the second optical input/output means of the first and second optical systems to the first optical input/output means of the first optical system and is restricted to be transmitted to the first and third optical input/output means of the second optical system and the second and third optical input/output means of the first optical system.

65. An optical system with waveguides comprising first and second optical systems according to claim 1;

wherein respective widths in a direction orthogonal to the light-traveling direction of the fourth and fifth multi-mode optical waveguides of the first optical system are different from each other;

wherein the respective second optical input/output means of the first and second optical systems are optically connected to each other through such as an optical fiber;

wherein the optical filter of the first optical system is adapted to allow a first light and a second light to be transmitted therethrough and to allow a third light to be reflected thereat;

wherein the optical filter of the second optical system is adapted to allow the first light and the second light to be reflected thereat and to allow the third light to be transmitted therethrough;

wherein the first light input from the first optical input/output means of the first optical system is transmitted through the second optical input/output means of the first and second optical systems to the third optical input/output means of the second optical system and is restricted to be transmitted to the first and third optical input/output means of the first optical system and the first and second optical input/output means of the second optical system;

wherein the second light input from the third optical input/output means of the second optical system is transmitted through the second optical input/output means of the first and second optical systems to the first optical input/output means of the first optical system and is restricted to be transmitted to the first and third optical input/output means of the second optical system and the second and third optical input/output means of the first optical system; and wherein the third light input from the first optical input/output means of the second optical system is transmitted through the second optical input/output means of the first and second optical systems to the third optical input/output means of the first optical system and is restricted to be transmitted to the first and third optical input/output means of the second optical system and the first and second optical input/output means of the first optical system.

66. An optical system with waveguides comprising first and second optical systems according to claim 1;
  wherein respective widths in a direction orthogonal to the light-traveling direction of the fourth and fifth multimode optical waveguides of the first optical system are different from each other;
  wherein the respective second optical input/output means of the first and second optical systems are optically connected to each other through such as an optical fiber;
  wherein the optical filter of the first optical system is adapted to allow a first light and a second light to be reflected thereat and to allow a third light to be transmitted therethrough;
  wherein the optical filter of the second optical system is adapted to allow the first light and the second light to be transmitted therethrough and to allow the third light to be reflected thereat;
  wherein the first light input from the third optical input/output means of the first optical system is transmitted through the second optical input/output means of the first and second optical systems to the first optical input/output means of the second optical system and is restricted to be transmitted to the first and third optical input/output means of the first optical system and the second and third optical input/output means of the second optical system,
  wherein the second light input from the first optical input/output means of the second optical system is transmitted through the second optical input/output means of the first and second optical systems to the third optical input/output means of the first optical system and is restricted to be transmitted to the first and third optical input/output means of the second optical system and the first and second optical input/output means of the first optical system; and
  wherein the third light input from the third optical input/output means of the second optical system is transmitted through the second optical input/output means of the first and second optical systems to the first optical input/output means of the first optical system and is restricted to be transmitted to the first and third optical input/output means of the second optical system and the second and third optical input/output means of the first optical system.

* * * * *

UNITED STATES PATENT AND TRADEMARK OFFICE
CERTIFICATE OF CORRECTION

PATENT NO. : 7,574,081 B2  Page 1 of 1
APPLICATION NO. : 11/604766
DATED : August 11, 2009
INVENTOR(S) : N. Miyadera It is certified that error appears in the above-identified patent and that said Letters Patent is hereby corrected as shown below:

Title Page, between Items (65) and (30), please insert:

-- Related Application Data

(63) Continuation of International (PCT) application No. PCT/JP2005/009526, filed May 25, 2005. --.

Column 1, between the title and the heading "FIELD OF THE INVENTION", please insert:

-- This application is a Continuation application of International (PCT) application No. PCT/JP2005/009526, filed May 25, 2005. --.

Please correct claim 62 as shown below:

Page 44, column 64, line 19, please delete "fiber", and insert -- filter --.

Signed and Sealed this

Tenth Day of November, 2009

David J. Kappos
*Director of the United States Patent and Trademark Office*